(12) United States Patent
Darr

(10) Patent No.: US 8,169,331 B2
(45) Date of Patent: May 1, 2012

(54) CIRCUIT PROTECTOR MONITORING ASSEMBLY

(75) Inventor: Matthew R. Darr, Godfrey, IL (US)

(73) Assignee: Cooper Technologies Company, Houston, TX (US)

( * ) Notice: Subject to any disclaimer, the term of this patent is extended or adjusted under 35 U.S.C. 154(b) by 1401 days.

(21) Appl. No.: 11/668,987

(22) Filed: Jan. 30, 2007

(65) Prior Publication Data

US 2007/0257807 A1 Nov. 8, 2007

Related U.S. Application Data

(63) Continuation-in-part of application No. 11/223,385, filed on Sep. 9, 2005, now Pat. No. 8,059,005.

(60) Provisional application No. 60/608,580, filed on Sep. 10, 2004.

(51) Int. Cl.
*G08B 21/00* (2006.01)
*G08B 13/14* (2006.01)
*G08B 1/08* (2006.01)
*H01H 85/20* (2006.01)

(52) U.S. Cl. ...... 340/635; 340/638; 340/639; 340/572.1; 340/572.7; 340/539.14; 337/186

(58) Field of Classification Search .................. 340/635, 340/638, 644, 572.1, 572.7; 337/206, 241, 337/243, 265; 439/488–491
See application file for complete search history.

(56) References Cited

U.S. PATENT DOCUMENTS

| 4,081,853 | A | | 3/1978 | Wickson |
| 4,263,589 | A | | 4/1981 | Lewiner et al. |
| 4,281,322 | A | | 7/1981 | Nasu et al. |
| 4,344,100 | A | * | 8/1982 | Davidson et al. ............... 361/45 |
| 4,349,813 | A | | 9/1982 | Ishibashi et al. |
| 4,554,607 | A | | 11/1985 | Mora |
| 4,556,874 | A | | 12/1985 | Becker |
| 4,635,044 | A | | 1/1987 | South |
| 4,635,045 | A | | 1/1987 | Miller et al. |
| H248 | H | | 4/1987 | Middlebrooks |
| 4,661,807 | A | | 4/1987 | Panaro |
| 4,691,197 | A | | 9/1987 | Damiano et al. |
| 4,837,520 | A | | 6/1989 | Golke et al. |
| 4,875,232 | A | | 10/1989 | Shumway |
| 4,952,915 | A | | 8/1990 | Jenkins et al. |
| 5,093,657 | A | | 3/1992 | Bishop et al. |
| 5,121,318 | A | | 6/1992 | Lipner et al. |
| 5,182,547 | A | | 1/1993 | Griffith |
| 5,233,330 | A | * | 8/1993 | Hase ............................. 340/638 |
| 5,247,454 | A | | 9/1993 | Farrington et al. |
| 5,291,139 | A | | 3/1994 | Fruhauf et al. |
| 5,343,192 | A | * | 8/1994 | Yenisey ........................ 340/639 |
| 5,347,418 | A | | 9/1994 | Ando et al. |
| 5,378,931 | A | | 1/1995 | Bolda et al. |
| 5,404,049 | A | | 4/1995 | Canada et al. |
| 5,561,580 | A | | 10/1996 | Pounds et al. |
| 5,585,554 | A | | 12/1996 | Handfield et al. |
| 5,731,760 | A | | 3/1998 | Ramirez |
| 5,859,596 | A | | 1/1999 | McRae |

(Continued)

FOREIGN PATENT DOCUMENTS

EP  1 258 838 A2  11/2002

(Continued)

*Primary Examiner* — Julie Lieu
(74) *Attorney, Agent, or Firm* — Armstrong Teasdale LLP

(57) ABSTRACT

Monitoring assemblies for determining an operational state of a circuit protector in an electrical circuit.

36 Claims, 15 Drawing Sheets

U.S. PATENT DOCUMENTS

| | | |
|---|---|---|
| RE36,317 E | 9/1999 | Arratia |
| 5,973,418 A | 10/1999 | Ciesielka et al. |
| 5,973,899 A * | 10/1999 | Williams et al. ............... 361/72 |
| 6,025,783 A | 2/2000 | Steffens, Jr. |
| 6,104,302 A | 8/2000 | Vuong |
| 6,192,325 B1 | 2/2001 | Piety et al. |
| 6,271,759 B1 | 8/2001 | Weinbach et al. |
| 6,366,208 B1 | 4/2002 | Hopkins et al. |
| 6,434,715 B1 | 8/2002 | Andersen |
| 6,469,457 B2 * | 10/2002 | Callahan ...................... 315/294 |
| 6,549,137 B1 | 4/2003 | Bruchmann |
| 6,566,996 B1 | 5/2003 | Douglass et al. |
| 6,597,179 B2 | 7/2003 | St-Germain |
| 6,624,638 B2 | 9/2003 | St-Germain |
| 6,633,475 B2 | 10/2003 | Thiele |
| 6,691,064 B2 | 2/2004 | Vroman |
| 6,696,969 B2 | 2/2004 | Torrez et al. |
| 6,745,151 B2 | 6/2004 | Marko et al. |
| 6,757,714 B1 | 6/2004 | Hansen |
| 6,806,808 B1 | 10/2004 | Watters et al. |
| 6,825,771 B2 | 11/2004 | Bruno et al. |
| 6,839,597 B2 | 1/2005 | Hattori et al. |
| 6,859,131 B2 | 2/2005 | Stanek et al. |
| 6,892,107 B2 | 5/2005 | Baba et al. |
| 6,895,368 B2 | 5/2005 | Murakami |
| 2002/0021226 A1 * | 2/2002 | Clement et al. .......... 340/870.31 |
| 2003/0107853 A1 * | 6/2003 | Marchand et al. ............... 361/42 |
| 2003/0212473 A1 * | 11/2003 | Vandevanter ................. 700/293 |
| 2005/0017908 A1 | 1/2005 | Saegrov |
| 2005/0024218 A1 | 2/2005 | Cuk |
| 2005/0225909 A1 * | 10/2005 | Yoshizaki et al. ............... 361/42 |

FOREIGN PATENT DOCUMENTS

| | | |
|---|---|---|
| WO | WO 99/05761 | 7/1998 |

* cited by examiner

CIRCUIT PROTECTOR MONITORING ASSEMBLY

This application is a continuation-in-part application of U.S. application Ser. No. 11/223,385 filed Sep. 9, 2005 now U.S. Pat. No. 8,059,005 and entitled Circuit Protector Monitoring Assembly, Kit and Method, which claims the benefit of U.S. Provisional Patent Application Ser. No. 60/608,580 filed Sep. 10, 2004 and entitled Methods and System for Circuit Protection, the entire disclosures of which are hereby incorporated by reference in their entirety.

This application also relates to U.S. application Ser. No. 11/223,702 filed Sep. 9, 2005 and entitled System and Method for Circuit Protector Monitoring and Management; U.S. application Ser. No. 11/224,586 filed Sep. 12, 2005 and entitled Circuit Protector Signal Transmission, Methods and System; U.S. application Ser. No. 11/223,618 filed Sep. 9, 2005 and entitled Circuit Protector Monitoring and Management System User Interface Method, System, and Program; U.S. application Ser. No. 11/223,484 filed Sep. 9, 2005 and entitled Multifunctional Handheld Response Tool, Method and System for Circuit Protector Management; and U.S. application Ser. No. 10/828,048, filed Apr. 20, 2004 and entitled Wireless Fuse State Indicator System and Method; and U.S. application Ser. No. 10/973,628 filed Oct. 26, 2004 and entitled Fuse State Indicating and Optical Circuit and System, the complete disclosures of which are also hereby incorporated by reference in their entirety.

BACKGROUND OF THE INVENTION

This invention relates generally to circuit protection devices, and more particularly to systems for managing electrical systems including circuit protection devices.

Electrical systems typically include a number of circuit protection devices that protect electrical circuitry, equipment, and components from damage. Overcurrent protection devices, for example, are constructed to physically open or interrupt a circuit path and isolate electrical components from damage upon the occurrence of specified overcurrent conditions in the circuit. Known circuit protection devices include devices such as fuses, circuit breakers, and limiters, which may address overcurrent, overload, and short circuit conditions in an electrical system, and other switching devices. As the size and complexity of electrical systems increase, the number of associated circuit protection devices also typically increases. Managing a complex electrical system having a large number of circuit breakers, any one of which may operate at any given time to isolate portions of the circuitry in the electrical system, is challenging.

DETAILED DESCRIPTION OF THE INVENTION

Exemplary embodiments of systems and processes that facilitate monitoring and management of circuit protection devices in electrical systems, referred to herein as "circuit protectors", and systems and processes that facilitate rapid response to specified operating conditions of the circuit protectors and associated circuitry are described below in detail. The systems and processes facilitate, for example, detection of operated circuit protectors, notification to responsible personnel of operated circuit protectors and their location in the system for response and attention by authorized personnel, diagnostics and troubleshooting of circuit protectors and electrical systems, and circuit protector inventory control and management for facilities management. A technical effect of the systems and processes described herein include at least one of organization and presentation of circuit protector information and electrical system data for facilities management and system oversight, real time alarm condition detection and notification for circuit protector operation, automated alert notification and summoning of personnel or site technicians to quickly reset and re-store downed circuitry due to operation of one or more circuit protectors, archived installation and performance data of the circuit protectors and associated electrical system for diagnostics and troubleshooting of electrical system perturbation events, and proactive management of electrical systems in anticipation of potential circuit perturbations.

A. Introduction

Figure 1:
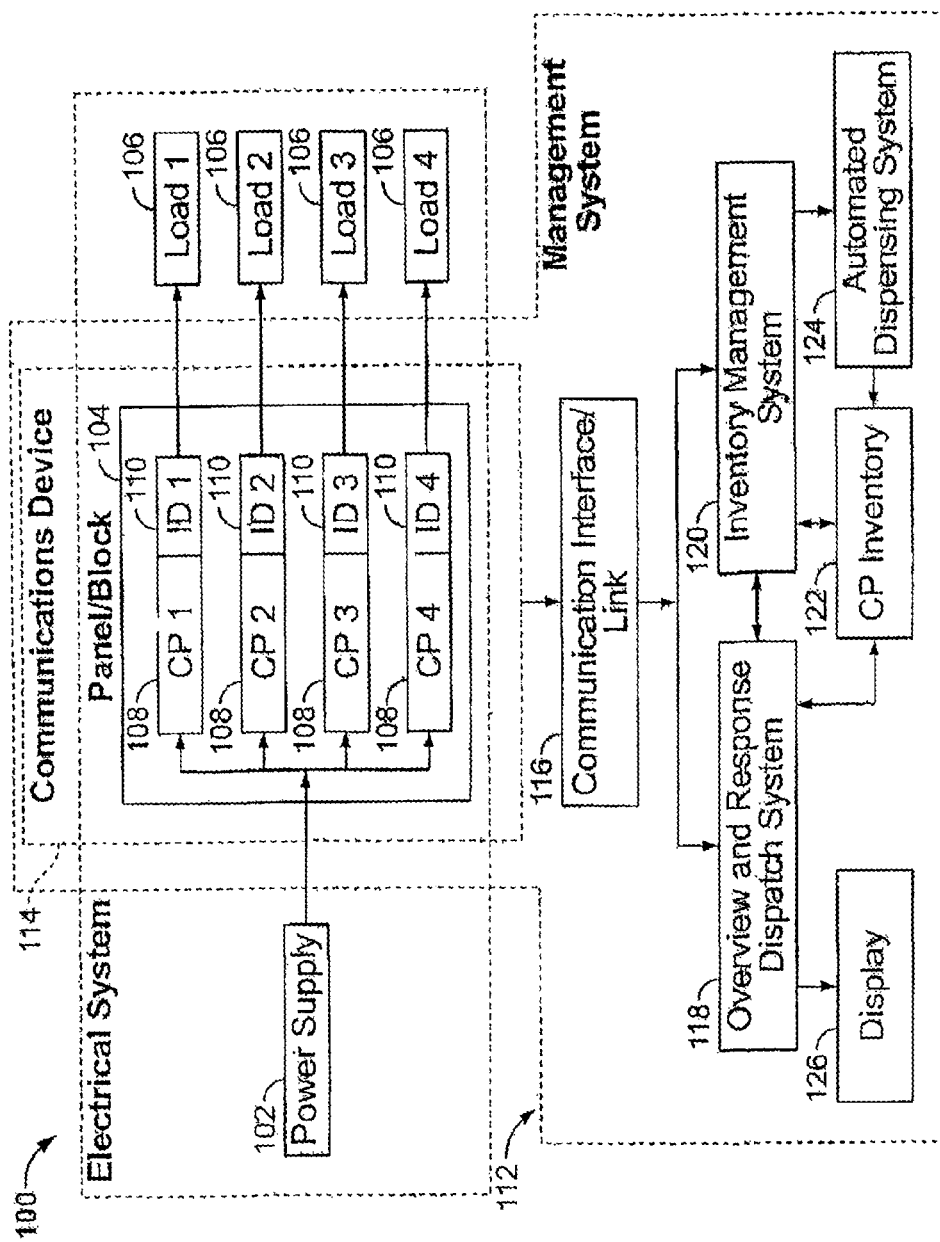
FIG. 1 is a schematic block diagram of an exemplary circuit protector management system coupled to an electrical system.

FIG. 1 is a schematic block diagram of an exemplary electrical system 100 representative of the type of system that utilizes circuit protectors. In different embodiments, and as a few examples, the electrical system 100 could be implemented as a battery powered electrical system for a vehicle, an AC or DC power distribution system for a building, industrial plant and/or control system, a communications network, other system as those in the art will appreciate.

In the illustrated embodiment, the electrical system 100 includes a power supply or power supply circuitry 102, a circuit protector panel, a circuit protector holder, a circuit protector block or a circuit protector cabinet (collectively referred to herein as "the panel 104") coupled to the power supply 102 by a line L, and a number of electrical loads 106 operatively connected to the panel 104. The panel 104 includes one or more circuit protectors 108 that interconnect the power supply 102 to the respective loads 106.

In various embodiments, the loads 106 may include electrical components such as transformers, inductors, integrated circuits; equipment such as machines, electrical motors and drive components, computers, programmable logic control systems; and sub-circuitry of the larger electrical system 100. Additionally, the loads 106 may serve as a secondary power source to additional loads of the same or different electrical systems.

The circuit protectors 108 in an exemplary embodiment are overcurrent protection devices, such as, for example, fuses, circuit breakers and/or switches. Each circuit protector 108 is constructed to physically break, open, or interrupt a circuit path or current path between line and load circuitry and isolate the loads 106, for example, from the power supply circuitry 102 to prevent damage to the loads 106 upon the occurrence of specified current conditions in the circuit, such as overcurrent, overload, and short circuit conditions. When such conditions occur, the circuit protectors 108 prevent current flow between the power supply circuitry 102 and the respective loads 106, protecting them from potential damage attributable to current flow in such conditions. That is, in normal current conditions the circuit protectors 108 are in a current carrying or unopened condition completing an electrical connection through between the power supply 102 and the loads 106, and in response to abnormal or unacceptable current conditions in the circuit, the circuit protectors 108 change or operate to a non-current carrying state, sometimes referred to as an opened or tripped condition breaking the electrical connection between the power supply 102 and the loads 106.

While one circuit protector panel 104 is illustrated in FIG. 1, it is understood that the electrical system 100 may include a plurality of circuit protector panels 104 in different embodiments. The panels 104 may be located in the same or different physical locations, and each of the circuit protectors 108 is associated with specific electrical loads 106 of the system. While four circuit protectors 108 are illustrated in the panel 104 for ease of illustration, it is contemplated that greater or fewer circuit protectors 108, including a single circuit protector 108, may be employed in the panel 104. That is, the circuit protector panel 104 may be configured or adapted to connect a single circuit protector 108 to the system 100, or alternatively may be adapted to connect a plurality of circuit protectors 108 as those in the art will appreciate.

In complex electrical systems, many circuit protectors 108 are typically required in different panels 104 of various sizes and configurations. Also, complex electrical systems typically include various types and configurations of circuit protectors 108 to meet particular needs of the loads 106 and associated electrical subsystems. The combination of large numbers of circuit protectors 108, assorted numbers of panels 104 in different locations, and various types of circuit protectors 108 in the electrical system 100 presents difficult problems in locating operated circuit protectors 108 and resetting or restoring the circuitry when one or more of the circuit protectors 108 in the electrical system 100 operates to protect the associated loads 106 in the system 100.

As the size and complexity of electrical system 100 increases, the potential locations of circuit protectors 108 in the system 100 increases too. The panels 104 containing the circuit protectors 108 may be located in different places in the electrical system 100, including different buildings, areas, compartments and portions of the electrical system site or facility. Therefore, when one or more circuit protectors 108 operate to open a portion of the circuitry in the electrical system 100, it can be a daunting task to locate which of the circuit protector devices 108 has operated, and to take corrective action to reset or restore affected circuitry and loads 106.

An elapsed time between operation of one or more circuit protectors 108 and re-energizing of the associated circuitry to restore full operation of the electrical system 100 is significant in many applications. For example, in an industrial plant control system or office building, the time in which affected machines or computers are unavailable due to operated circuit protection devices amounts to lost productivity and economic loss. For virtually any electrical system, and especially for critical electrical systems, minimizing the time and effort required to locate operated circuit protectors 108 and to take corrective action is desired.

When the circuit protectors 108 are circuit breakers, once the appropriate location of an operated circuit breaker has been identified, the breaker or breakers can generally be quickly reset. Locating the correct breakers, however, is not always a quick or easy task when there are a large number of breakers in different locations or panels 104 in the electrical system 100. To locate the operated breakers quickly, downed circuitry or equipment typically is matched with the appropriate breakers of the system 100, which requires some detailed knowledge of the electrical system 100 that maintenance personnel may or may not have at any given time. Alternatively, and probably more likely in most cases, maintenance personnel systematically inspect all of the circuit protector breakers in the electrical system to locate tripped breakers. Such an exercise is usually inefficient, except perhaps in situations where by mere chance the personnel starts the inspection in the area of the operated breakers. Also, locating tripped breakers can be complicated when breakers in more than one location are tripped, and in the case of faulty or inoperative breakers which are not tripped, restoring the circuitry of the electrical system 100 when one or more of the circuit protectors 108 operates can be extremely difficult and time intensive.

When the circuit protectors 108 include fuses, operated fuses must be located, replacement fuses must be obtained, and the operated fuses must be replaced to reset the circuitry of the electrical system 100. If a replacement fuse is on hand and the location of the operated fuse is known, the fuse can typically be quickly replaced to restore the circuitry. Locating which fuse or fuses has opened, however, and obtaining the proper replacement fuses, is not always easy. Fuses of different types may be located in various places throughout the electrical system 100, and locating the proper replacement fuse from a large inventory of different fuse types, whether on site or at a remote location, can be time intensive. As with circuit breakers, locating operated fuses can be complicated when more than one fuse operates, and locating faulty fuses or improperly installed fuses in the electrical system 100 can be extremely difficult. Additionally, properly managing, maintaining, and replenishing a replacement fuse inventory to meet actual and anticipated needs of the electrical system 100 can be difficult.

In addition, circuit protectors 108 tend to operate with little or no advanced warning. Thus, troubleshooting the electrical system 100 and/or taking preemptive action before the circuit protectors 108 operate is difficult, if not impossible, in many electrical systems. Additionally, diagnosing the electrical system 100 to determine why or how certain circuit protectors 108 operated is often an after-the-fact analysis and can be speculative in nature.

B. The Circuit Protector Management System

In an exemplary embodiment, and to alleviate these and other difficulties, each of the circuit protectors 108 is associated with a status element 110 located internal or external to the circuit protector 108. That is, the status element 110 may be located interior to or inside the circuit protector 108, on an external surface of or otherwise outside of the circuit protector 108, or even at another location at a distance from the circuit protector 108. As described further below, in different embodiments the status elements 110 may be implemented in electronic form or be mechanically actuated to interface the status elements 110 to the circuit protector management system 112. When a circuit protector 108 operates to open a circuit path in the electrical system 100, the associated status element 110 aids in identifying the circuit protector so that the circuitry can be efficiently re-energized with minimal time delay.

Each of the status elements 110 of the circuit protectors 108 is responsive to operation of the respective circuit protector 108, and in exemplary embodiments the status elements 110 transmit or communicate signals or data to an circuit protector management system 112. The status elements 110 in some embodiments may be used as data collectors regarding operating conditions of the circuitry in the electrical system 100, as explained further below.

In an exemplary embodiment, the circuit protector management system 112 may include in whole or in part a communications device 114 in communication with the status elements 110 of the circuit protectors 108, a communications interface or link 116, an overview and response dispatch system 118 in communication with the link 116, and an inventory management system 120 in communication with the link 116 and/or the overview and response dispatch system 118.

During operation of the electrical system 100, signals are sent from the status elements 110 of the circuit protectors 108, through the communications device 114 and the communication link 116, to the overview and response dispatch system 118. The communications device 114 allows the status elements 110 associated with the circuit protectors 108 to communicate with the overview and response dispatch system 118 and the inventory management system 120 via the communications interface 116. In particular, when any of the circuit protectors 108 operates to interrupt, break, or open a circuit path to one or more of the loads 106, a signal is communicated from the respective identification element 112 via the communications device 114 and the communication link 116 to the overview and response dispatch system 118 and/or to the inventory management system 120.

The overview and response dispatch system 118 and/or the inventory management system 120 are, in turn, associated with an inventory 122 of circuit protectors and an automated or manual dispensing system 124 for stocking and replenishing the inventory 122 as the inventory is used. The inventory 122 may be located on site or at another location from the electrical system 100.

In an exemplary embodiment, the communications device 114 is located proximate to the circuit protectors 108, either integrated into the construction of the panel 104 or in a location proximate to the panel 104. The communications interface or link 116 may be a hard-wired communications link, optical link, wireless communications link, satellite link, and equivalents thereof as explained further below. Additionally, the communications interface or link 116 may utilize existing infrastructure in the electrical system 100, and may operate, for example, using known power line frequency carrier technology or equivalents thereof over existing wires and conductors in the electrical system 100. Combinations of such communications links may likewise be provided in different embodiments of the management system 112.

The communications link 116 may be a dedicated interface or link used only for circuit protector management purposes by the management system 112, or may also serve other unrelated purposes and be used for transmission of other signals, data and communications as desired. Communication between the communications device 114 and the overview and response dispatch system 118 may be established using known data transmission protocols and network communication technologies such as DeviceNet and Datahiway protocols. Ethernet connections multiplexing communication schemes, wireless technologies, satellite transmission schemes, equivalents thereof, and the like may also be used as those in the art will appreciate.

While one communications device 114 is illustrated in FIG. 1, it is contemplated that more than one communications device 114 may be employed in the circuit protector management system 112. Multiple communication devices 114 may furthermore be employed in the same panel 104 depending upon the number of circuit protectors 108 in the panel 104 and the sophistication of the management system 112. In exemplary embodiments, as further explained below, one communication device 114 may be used to monitor multiple circuit protectors 108 and transmit information to the overview and response dispatch system 118.

In various embodiments, the overview and response dispatch system 118 may be a network-based system, a personal computer, a computer workstation, a programmable logic controller or other electronic controller, a processor-based hand held device or another electronic device or equivalent that may receive and process or interpret signals from the link 116. In one embodiment, the overview and response dispatch system 118 may include a user display 126 to alert an operator or maintenance personnel of an issue with the electrical system 100, such as an operated circuit protector 108 which has broken a circuit path in the electrical system 100.

In different embodiments, the inventory management system 120 is a network-based computer system, a personal computer, a computer workstation, a processor-based hand held device, a programmable logic controller or an electronic controller or other electronic device which receives signals from the link 116 and/or the overview and response dispatch system 118 and is capable of responding appropriately. The inventory management system 120 may be integrated into the overview and response dispatch system 118 as desired, or may be a separate device in the same or different location from the overview and response dispatch system 118. The inventory management system 120 is associated, directly or indirectly, with the inventory 122, and is in communication with the automated dispensing system 124. The automated dispensing system 124 may be of a known type currently used in industrial and business facilities to provide uninterrupted access to supplies. Such automated dispensing systems are commercially available and sometimes referred to as Smart Inventory Systems. The automated dispensing system 124 electronically receives and processes orders for circuit protection products so that the product orders are filled and the circuit protection products are delivered to the inventory 122 with minimal delay. Alternatively, a manual inventory system may be employed to dispense and replenish the circuit protection devices.

While one automated dispensing system 124 is shown in FIG. 1, it is appreciated that the overview and response dispatch system 118 and inventory management system 120 may communicate with more than one automated dispensing system 124 to obtain inventory products from the same or different circuit protection product vendors, distributors or suppliers as desired. Additionally, the overview and response dispatch system may communicate with known computerized maintenance management system (CMMS), supervisory control and data acquisition (SCADA) systems, industrial control and automation systems, enterprise resource planning (ERP) systems, Electronic Data Interchange (EDI) systems, Manufacturing Resources Planning (MRP) systems, and supply chain management systems in addition to or in lieu of the inventory management system 120.

By virtue of the status elements 110 associated with the fuses 108, and as further explained below, the overview and response dispatch system 118 may direct an operator or maintenance personnel to a precise location and to one or more specific circuit protectors 108 in the electrical system for resetting or restoring the circuitry. Additionally, the overview and response dispatch system 118 may locate proper replacement circuit protectors in the inventory 122 and direct personnel to a precise location to obtain the proper replacement circuit protectors, while contemporaneously ordering additional circuit protectors via the manual or automated dispensing system 124 to replenish the inventory 122 as it is used. Thus, the electronic management system 112 can provide precise instruction to personnel regarding the circuit protectors 108 to minimize down time of the associated load 106 for the operated circuit protector 112. The circuit protectors 108 may therefore be attended to as efficiently as possible, and automated ordering of replacement parts for the circuit protector inventory 122 ensures prompt replenishing of the inventory and eliminates error in inventory management. Factory automation technologies and equivalents thereof may be used to ensure that replacement circuit protectors are available for use and pinpoint their location in a physical plant for retrieval by maintenance personnel, and inventory management is accomplished in an automated manner without human intervention or action by maintenance personnel.

Figure 2:
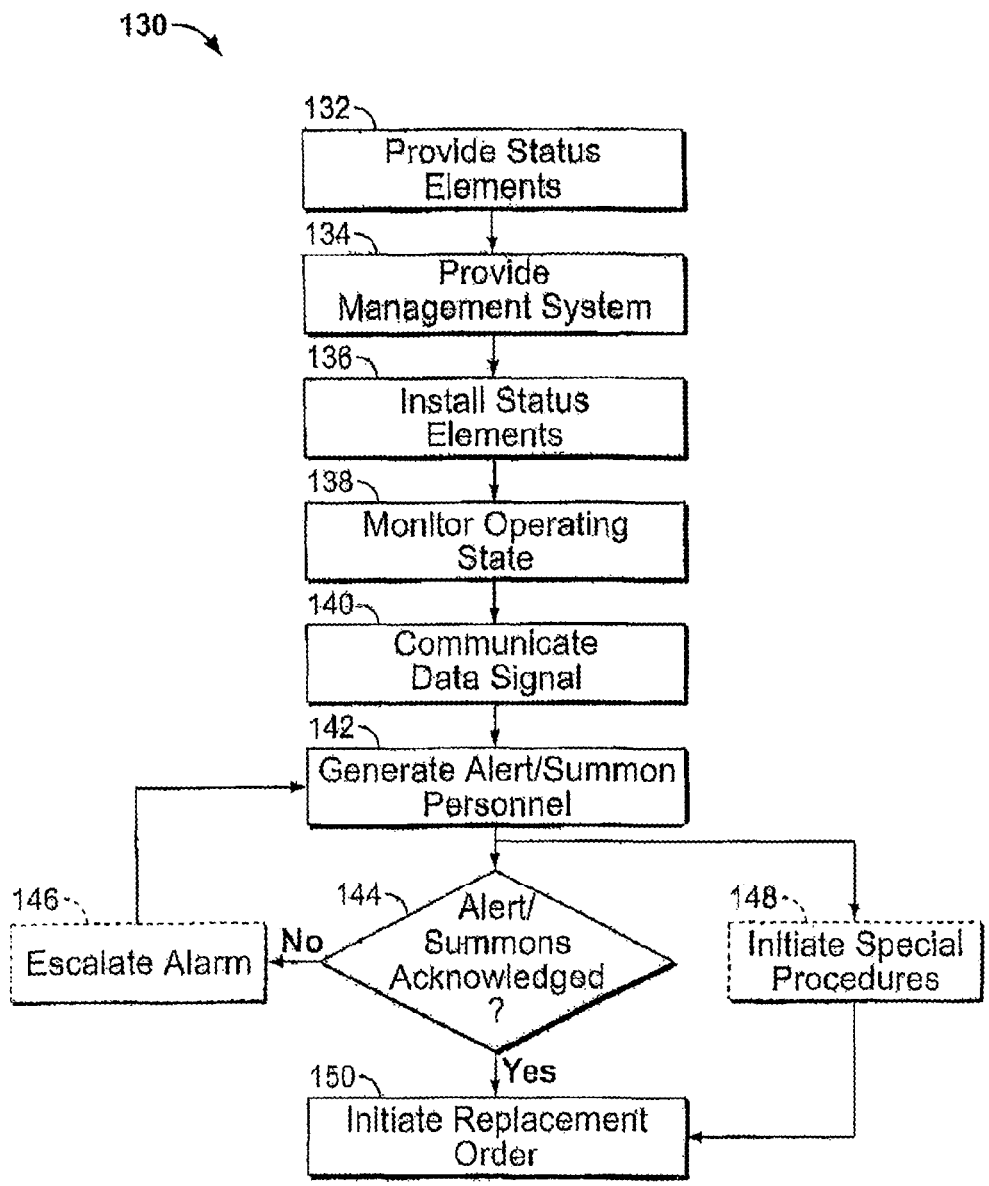
FIG. 2 is a method flowchart for the circuit protector management system shown in FIG. 1.

FIG. 2 is a flowchart of an exemplary method 130 for monitoring circuit protectors 108 utilized the circuit protector management system 112 shown in FIG. 1. The method 130 facilitates efficient re-energizing affected circuitry in an electrical system 100 when one or more of the circuit protectors 108 operates to isolate one portion of an electrical system 100 from another portion of the electrical system 100, such as isolating one or more of the loads 106 from the power supply 102.

In an exemplary embodiment, the method 130 includes providing 132 status elements, embodiments of which are explained below, proximate to the respective circuit protectors of interest in the electrical system, and providing 134 the electronic overview and response dispatch system responsive to the status elements. Once the status elements are installed 136, they may be used to monitor 138 an operating state of the circuit protectors.

Based upon the sensed state of the circuit protectors, a data signal may be transmitted 140 from at least one of the status elements to a remote device or location when one of the circuit protectors has operated to isolate a portion of the electrical system. The data signal, may include, for example, an identification code and an address code to identify the location of the operated circuit protector, and detailed information and instruction to appropriate personnel to reset or restore the circuitry quickly and efficiently. When interpreted at the remote location by the overview and response dispatch system, the data signal may be converted to an instruction to an operator or technician that may include, for example, information regarding the location of operated circuit protectors, information needed to properly reset or restore the circuitry affected by the operated circuit protectors, inventory information for replacement circuit protectors needed to properly restore the circuitry, and information pertaining to operating conditions of the circuitry for diagnostic and troubleshooting purposes. The instruction to personnel may further include specific information regarding potential hazards in the location of the circuit protector, and information regarding precautions that should be taken and personal protection equipment that should be utilized when responding to an operated circuit protector.

In response to the data signals communicated 140 to the overview and response dispatch system, the overview and response dispatch system generates 142 an alert and summons to responsible personnel, informing them of the operated circuit protector and the location of the operated circuit protector. For example, the overview and response dispatch system may directly communicate with an operator, maintenance personnel, or others via a remote device such as a computer, pager, dispatcher, a hand-held device such as a personal digital assistant (PDA), personal information manager (PIM), or electronic organizer, cellular phone or equivalent device which is either networked with the overview and response dispatch system or in communication with the overview and response dispatch system and capable of reaching appropriate personnel. That is, the overview and response dispatch system may be active instead of passive, and instead of simply providing an alert and waiting for human response, the overview and response dispatch system is capable of actually seeking and directly contacting specific persons in multiple ways, and summoning them to respond and intervene as needed to properly manage the electrical system.

The alert and summons may be provided, for example, in an email notification, a fax notification, a pager notification, a web page notification, a voice notification, or other means. The overview and response dispatch system may wait 144 for acknowledgment of the alert and summons by one or more of the designated personnel, and if no acknowledgment is received, another alert and summons is sent. Optionally, the overview and response dispatch system may escalate 146 the frequency or intensity of the alerts and summons depending upon responsiveness of the designated personnel or actual operating conditions of the electrical system. For example, if multiple circuit protectors open at about the same time, a larger problem with the electrical system could be implicated and the management system may more urgently generate alarms, alerts and summons to address potential problems.

Optionally, the overview and response dispatch system may also automatically undertake and initiate 148 other desired actions without human intervention, such as activating auxiliary power to the affected loads corresponding to specific machines or equipment, shutting down at risk systems or loads corresponding to specific machines or equipment, saving key circuit data for analysis, etc. when the circuit protectors 108 operate to open portions of the electrical system 100, and communicating such undertakings and actions to designated personnel for further evaluation and response.

More than one person may be contacted by the overview and response dispatch system and summoned to help re-energize affected circuitry, for example, by replacing operated fuses. Alerts and requests for action by designated personnel may be sent repeatedly from the overview and response dispatch system within specified time periods until acknowledged by appropriate personnel, and escalated alerts and summons may be generated and special procedures implemented as appropriate to deal with different situations depending upon the sophistication of the circuit protector management system 112.

Because the alert and notifications are sent more or less contemporaneously with the operation of the circuit protectors, and because the overview and response dispatch system actively attempts to find, contact and summon personnel and provides complete information needed to re-energize affected circuitry, including at least the type and location of operated circuit protectors, downed circuitry may be quickly re-energized and the full electrical system restored in as quick a time as possible. Automated alerts and summons may be sent around the clock without human intervention as needs arise. The information pertaining to operated circuit protectors can be presented to the end user in an easy to use tabular or graphical form in real time as the circuit protectors operate, and the end recipient of the information need not gather additional information to complete the task of re-energizing circuitry.

By actively seeking and contacting appropriate personnel, as opposed to a reactive system that is dependent upon human response, the overview and response dispatch system is not dependent upon specific persons and designated personnel being in any specific location, such as a workstation, terminal, or working area to receive an alert notification of an operated circuit protector. Rather, the overview and response dispatch system directly seeks out designated persons and contacts them wherever they may be found. Thus, should the persons or personnel be away from a desk, workstation, terminal or working area during working or non-working hours, the overview and response dispatch system is capable of reaching them by other means and instantly notifying them of operated circuit protectors, rather than having to wait for them to return to receive an alert message at their desk, workstation, terminal or working area.

When used as data collectors, the status elements may facilitate monitoring, troubleshooting, and diagnosis of the electrical system as the circuit protectors are monitored 138 and signals are communicated 140 to the overview and response dispatch system. Through monitoring and analysis of such data, potential problems in the system may be more accurately identified and resolved, and more reliable operation of the electrical system may be achieved. In such an embodiment, the alert or summons generated 142 by the overview and response dispatch system may include a warning or alarm to system operators or personnel to anticipate potential circuit opening events and circuit perturbations that may otherwise cause the circuit protectors to operate, potentially providing time for preemptive measures to be taken before one or more of the circuit protectors operate to break the associated circuit paths in the electrical system. The associated time, cost, expense and inconvenience of opened circuitry in the electrical system and the associated time, cost, expense and inconvenience involved in resetting, restoring or re-energizing the circuitry due to operated circuit protectors may therefore potentially be avoided in the first instance with proactive management of the electrical system.

The overview and response dispatch system may further initiate 150 a replacement order to replenish, for example, a fuse inventory when the operated fuse or fuses in the electrical system has been replaced.

C. The Status Elements and Circuit Protector Monitoring

It is contemplated that may different status elements and circuit protector monitoring assemblies may be provided in the circuit protector management system 112. Exemplary embodiments will now be described for illustrative purposes only. It is understood that other monitoring assemblies may be used in addition to the examples set forth below with equal effect.

Figure 3:
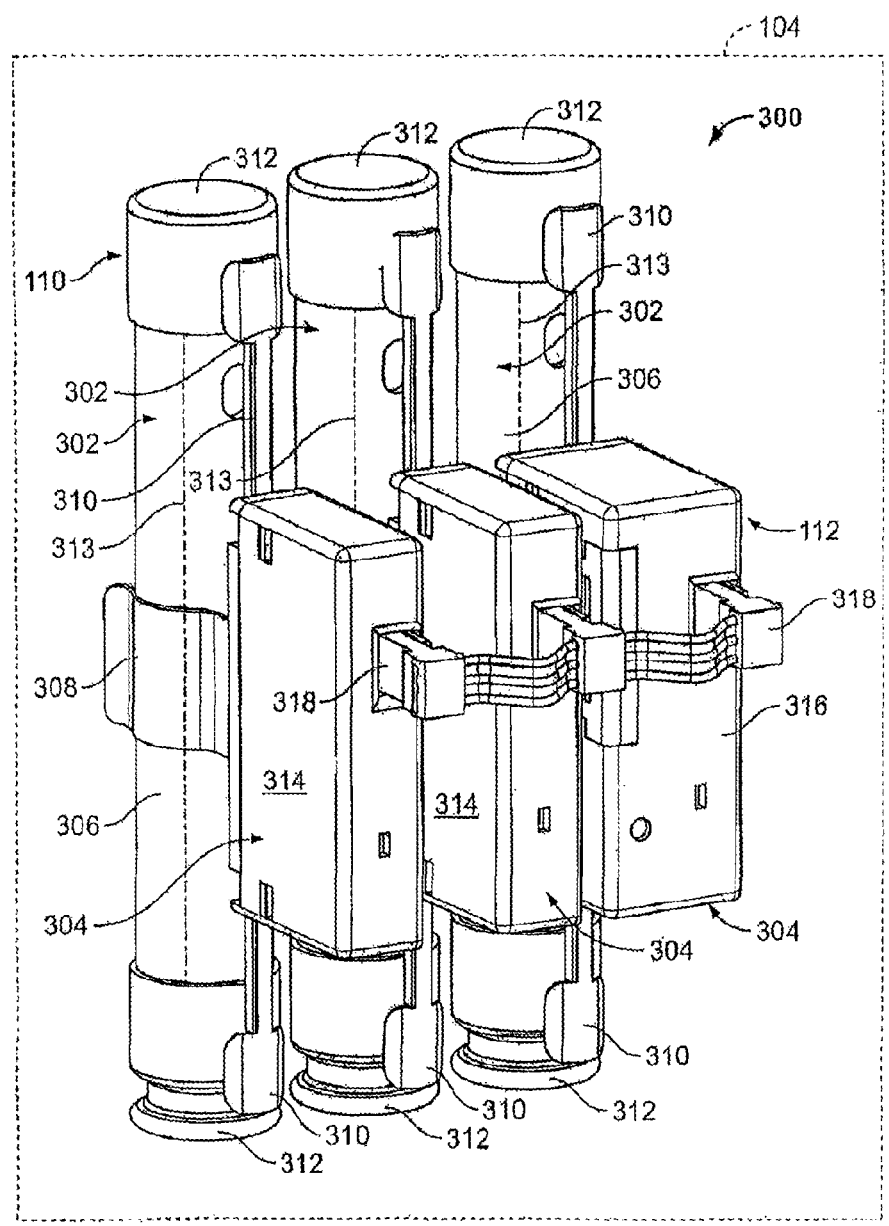
FIG. 3 is a perspective view of another embodiment of a circuit protector and panel assembly for the circuit protector management system shown in FIG. 1.

FIG. 3 is a perspective view of an exemplary circuit protector 108 and panel 104 that may be used in the circuit protector management system 112 and the method 130 wherein the status elements 110 are provided in the form of a monitoring module assembly 300. The monitoring module assembly 300 is associated with a plurality of circuit protectors in the form of fuses 302, and the assembly includes a plurality of monitoring modules 304 that are attached to the bodies 306 of the respective fuses 302. In an exemplary embodiment, the monitoring modules 304 are individually mounted to the fuse bodies 306 via a clip 308 to an exterior surface of the respective fuse bodies 306, thereby facilitating retrofit installation to the fuses 302 in an electrical system. As previously explained, the fuses 302 may be housed and arranged in the panel 104 in the electrical system to interconnect power supply circuitry 102 and various loads 106 in the electrical system.

The monitoring modules 304 may each include contact arms 310 extending outwardly from the modules 304 in a direction substantially parallel to the respective fuse body 306. The contact arms 310 of the respective modules 304 mechanically and electrically engage the terminal elements 312 of the fuses 302 so that the fuses 302 may be monitored in use. A primary fuse element 313 defines an interruptible current path between the terminal elements 312 of each of the fuses 302, and when the current path is opened or interrupted in an overcurrent condition, the modules 304 sense the operation of the fuses 302 in real time.

In an exemplary embodiment, the monitoring modules 304 include sensor modules 314 associated with some of the fuses 302 and a communications module 316 associated with one of the fuses 302. The sensor modules 314 and the communications module 316 may be interconnected to one another via interface plugs 318 and three wire connections, for example, as illustrated in FIG. 3.

Figure 4:
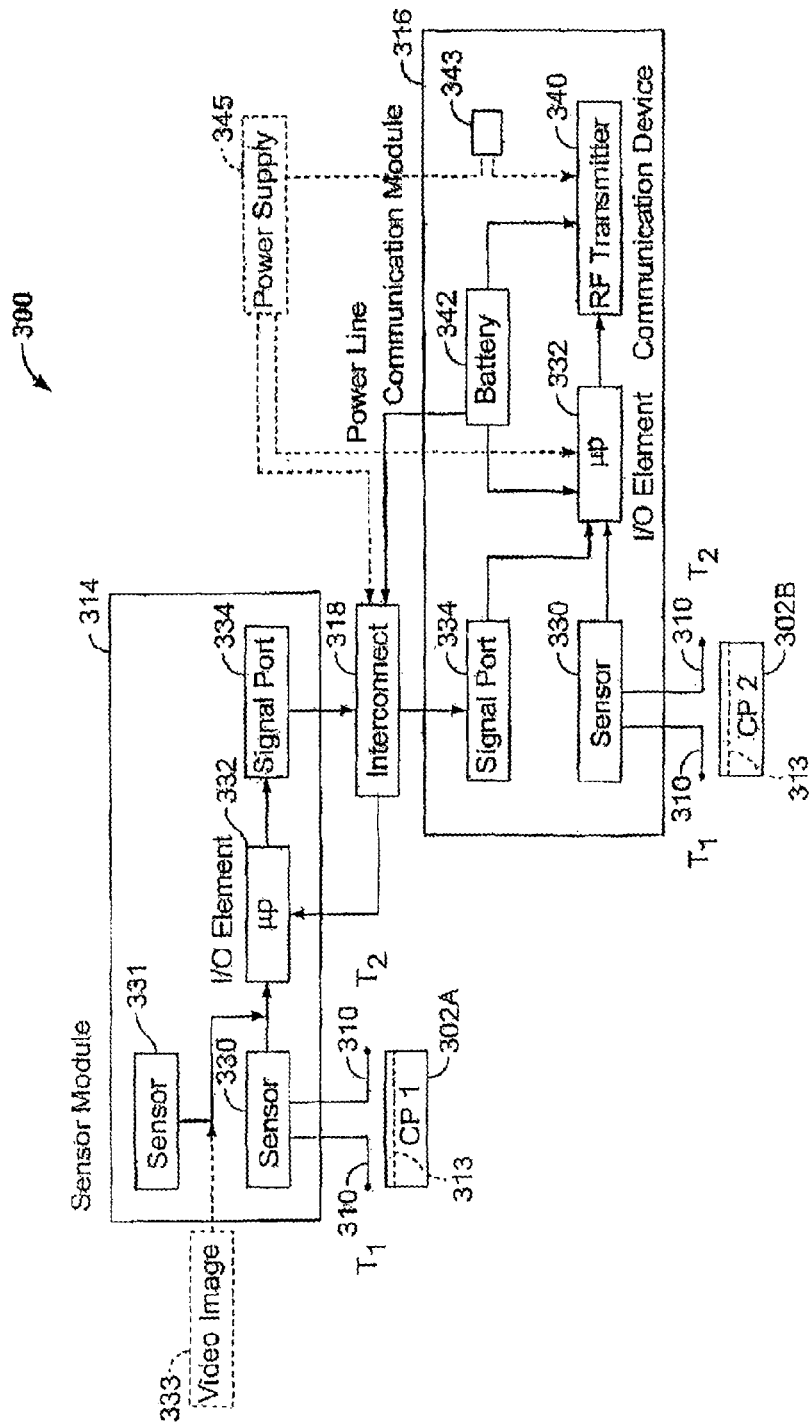
FIG. 4 is a schematic block diagram of the monitoring assembly shown in FIG. 3.

Referring now to FIG. 4, the construction of the sensor modules 314 and the communications module 316 will be described. Each sensor module 314 includes a sensor 330, an input/output element 332 connected to the sensor 330, and a signal port 334. The sensor 330 is connected to the contact arms 310 that are connected to the terminal elements $T_1$ and $T_2$ of one of the circuit protector fuses 302A. In one embodiment, the sensor 330 is a voltage sensing latch circuit having first and second portions optically isolated from one another. When the primary fuse element 313 of the fuse 302A opens to interrupt the current path through the fuse 302A, the sensor 330 detects the voltage drop across the terminal elements $T_1$ and $T_2$ of the fuse 302A. The voltage drop causes one of the circuit portions, for example, to latch high and provide an input signal to the input/output element 332. Acceptable sensing technology for the sensor 330 is available from, for example, SymCom, Inc. of Rapid City, S. Dak.

While in the exemplary embodiment, the sensor 330 is a voltage sensor, it is understood that other types of sensing could be used in alternative embodiments to monitor and sense an operating state of the circuit protector 302A, including but not limited to current temperatures and temperature sensors that could be used to determine whether the primary fuse element 313 has been interrupted in an overcurrent condition to isolate a portion of the associated electrical system.

In a further embodiment, one or more additional sensors or transducers 331 may be provided, internal or external to the sensor module 314, to collect data of interest with respect to the electrical system and the load connected to the fuse 302A. For example, sensors or transducers 331 may be adapted to monitor and sense vibration and displacement conditions, mechanical stress and strain conditions, acoustical emissions and noise conditions, thermal imagery and thermalography states, electrical resistance, pressure conditions, and humidity conditions in the vicinity of the fuse 302A and connected loads. The sensors or transducers 331 may be coupled to the input/output device 332 as signal inputs. Video imaging and surveillance devices 333 may also be provided to supply video data and inputs to the input/output element 332.

In an exemplary embodiment, the input/output element 332 may be a microcontroller having a microprocessor or equivalent electronic package that receives the input signal from the sensor 330 when the fuse 302A has operated to interrupt the current path through the fuse 302A. The input/output element 332, in response to the input signal from the sensor 330, generates a data packet in a predetermined message protocol and outputs the data packet to the signal port 334. The data packet may be formatted in any desirable protocol, but in an exemplary embodiment includes at least an identification code, a fault code, and a location or address code in the data packet so that the operated fuse may be readily identified and its status confirmed, together with its location in the electrical system. Of course, the data packet could contain other information and codes of interest, including but not limited to system test codes, data collection codes, security codes and the like that is desirable or advantageous in the communications protocol.

Additionally, signal inputs from the sensor or transducer 331 may be input the input/output element 332, and the input/output element 332 may generate a data packet in a predetermined message protocol and output the data packet to the signal port 334. The data packet may include, for example, codes relating to vibration and displacement conditions, mechanical stress and strain conditions, acoustical emissions and noise conditions, thermal imagery and thermalography states, electrical resistance, pressure conditions, and humidity conditions in the vicinity of the fuse 302A and connected loads. Video and imaging data, supplied by the imaging and surveillance devices 333 may also be provided in the data packet.

The communications module 316 in an exemplary embodiment may also include a sensor 330, an input/output element 332, and a signal port 334. Like the sensor module 314, the sensor 330 of the communications module 316 is connected to the contact arms 310 that are connected to the terminal elements $T_1$ and $T_2$ of one of the circuit protector fuse 302B, and the sensor 330 of the communications module 316 operates substantially in the same manner as described above to sense an operating state of a primary fuse element 313 in the fuse 302B. However, when the sensor 330 detects operation of the fuse 302B, the input/output element 332 generates and outputs a corresponding data packet to a transmitter 340 that communicates with the overview and response dispatch system 118. The transmitted data packet from the communications module 316, in addition to the data packet codes described above, also includes a unique transmitter identifier code so that the overview and response dispatch system may identify the particular communications module 316 that is sending a data packet.

In one embodiment, the transmitter 340 is a low power radio frequency (RF) signal transmitter that digitally transmits the data packet in a wireless manner. Point-to-point wiring in the electrical system for fuse monitoring systems is therefore avoided, although it is understood that point-to-point wiring could be utilized in some embodiments of the invention. Additionally, while a low power digital radio frequency transmitter has been specifically described, it is understood that any of the aforementioned wireless communication schemes and equivalents could alternatively be used if desired.

The communications module 316 further includes an onboard battery power supply 342 that powers the electronic sensor 330 and/or the input/output element 332 and the transmitter 340 of the communications module 316. The battery 342 may also supply power, through the interface plugs 318, to the input/output element 332 and/or the sensor 330 of the communications module 316. Thus, multiple sensor modules 314 may be powered by a single communications module 316 to monitor a plurality of fuses 302. For example, one of the three wire connections shown in FIG. 3 may be a power line connecting the battery 342 to one or more sensor modules 314. The battery 342 may be replaceable as needed to extend the life of the monitoring assembly 300, and a test button, for example, may be provided in the communications module 316 to ensure that the battery 342 is powered and the module electronics in the communications module 316 and connected sensor modules 314 are working properly. Reset buttons may also be provided in the modules for testing and diagnostic purposes. A power harvesting device 343, such as rechargeable batteries and the like that store energy when not in use may be utilized in addition to or in lieu of the battery 342. A backup power supply 345, or other circuits of the electrical system may also be used to power the sensor and communications modules 314, 316. Energy storage components such as capacitors may also be employed, and switching devices may be provided to switch between energy storage elements, power harvesting devices, batteries, and backup power supplies, or other circuitry to power communications after circuit protector 302A has operated.

Also, the signal port 334 of the sensor module 314 may communicate, via the interface plug 318 with the signal port 334 of the communications module 316. Thus, for example, considering the embodiment of FIG. 4, when the primary fuse element 313 opens in the fuse 302A associated with the sensor module 314, the sensor module input/output element 332 generates a data packet that is sent to the sensor module signal port 334 through the interface plug 318 and to the communications module input/output element 332 for transmission via the transmitter 340. Thus, signals are simply passed through the respective signal ports 334 via the interface plug 318, and multiple sensor modules 314 may be connected to a single communications module 316 via interconnecting the interface plugs 318 to the signal ports 334. In such a manner, the number of communication modules 316 and transmitters 340 in the circuit protector management system may be reduced, together with associated costs and maintenance issues.

Additionally, status indicators and the like such as light emitting diodes (LED's) may be provided in the sensor and communication modules 314, 316 to locally indicate an operated fuse 302. Thus, when maintenance personnel arrives at the location of the operated fuse 302, the status indicators may provide local state identification of the fuses associated with the modules 314, 316.

Notably, the monitoring modules 304, including the sensor modules 314 and communications modules 316 are provided in modular form wherein different sized mounting clips 308 and differently dimensioned contact arms 310 may be provided to accommodate fuses of varying sizes and configurations. By providing various mounting clips and mounting structure, together with various contact arms and contact structure to establish electrical contact with the fuses, the modules 304 are readily adaptable to accommodate most if, not all, types of fuses, and the modules 304 may be retrofitted to complex electrical systems with snap-on engagement, thereby minimizing installation time and complexity in existing electrical systems.

Figure 5:
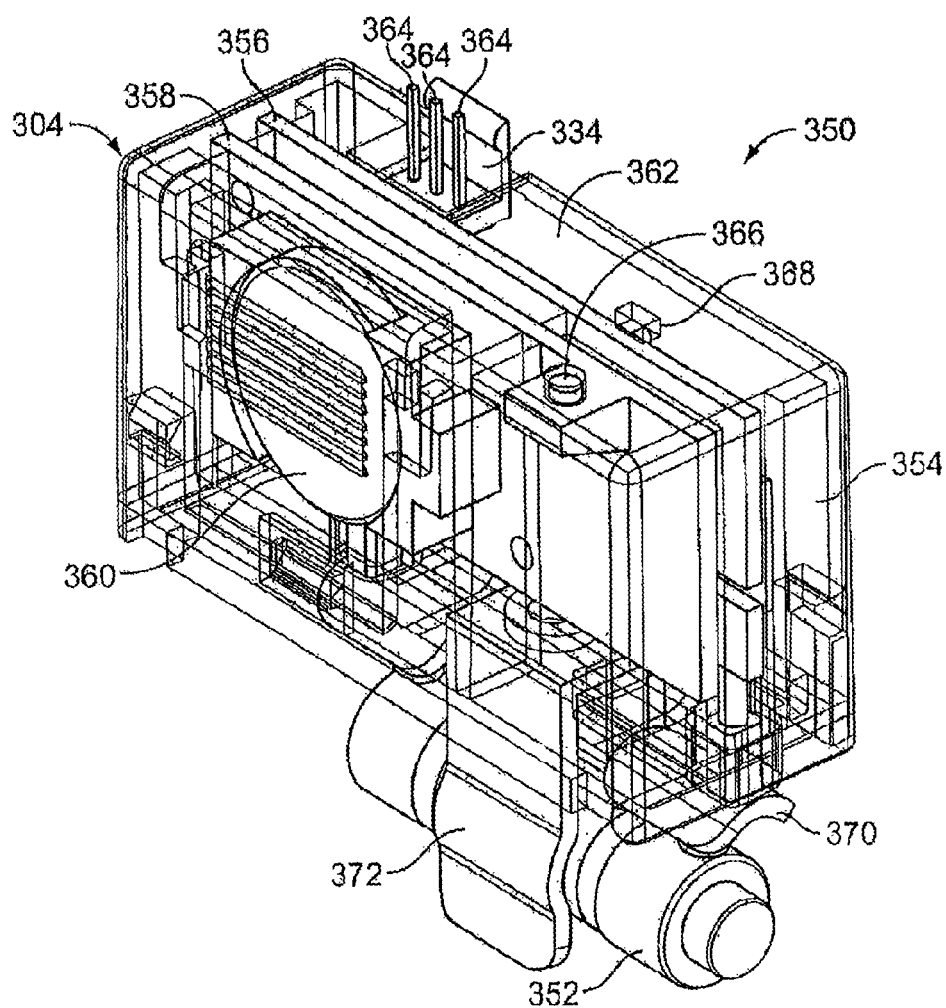
FIG. 5 is a perspective view showing internal parts of a module that may be used in the assembly of FIGS. 3 and 4.

FIG. 5, for example, illustrates a single phase monitoring assembly 350 including a monitoring module 304 and a circuit protector in the form of a fuse 352. The module 304 includes a body or housing 354, a sensor board 356, a communications board 358, and a battery 360 mounted therein and forming a protective enclosure thereabout. The sensor board 356 includes, for example, sensing circuitry 330 to detect operation of the fuse, such as the aforementioned voltage sensing, current sensing, or temperature sensing circuitry, and the communications board includes, for example, the input/output element 332 and the transmitter 340 for generating data messages and signals when the fuse 352 operates to open the circuit.

The signal port 334 is exposed through an outer surface 362 of the module 304, and in an exemplary embodiment, the signal port 334 includes contacts 364 that interface with, for example, mating interconnect plugs such as the plugs 318. The module 304 may therefore be connected to another monitoring module 304 in the larger electrical system.

With the communications board 358 and battery 360, the module 304 may function as the communications module 316 described above. Without the communications board 358 and battery 360, the module 304 may function as a sensor module 314 as described above. The communications board 358 may include a low power radio frequency transmitter as described above, or may alternatively communicate with a remote device by any of the aforementioned methods.

A test/reset button 366 extends through the outer surface 362 of the housing 354, and a status indicator opening 368 is provided in the outer surface 362. A light emitting diode (LED), for example, may be connected to the sensor board 356 and may be illuminated when the fuse 352 opens to isolate a portion of electrical circuitry connected thereto, thereby providing visible local indication in the housing 354. Contact arms 370 are attached to the housing 354 and are electrically connected to the sensor board 356 for monitoring of the fuse 352 when the contact arms 370 are mechanically engaged to the terminal elements of the fuse 352.

A mounting element 372 attaches to the exterior surface of the fuse body, thereby permitting retrofit installation to the fuse 352 when the fuse 352 is installed in an electrical system.

Various adaptations of the monitoring modules 304 may be made to use the modules 304 on various types of circuit protectors and systems. For example, modules suitable for single phase, three phase, and polyphase circuit breaker systems may be provided. Modules may be provided as sensor modules or communication modules. Various types of contact arms and mounting structure may be provided for use with various types of circuit protectors and for circuit protectors of varying size, and the modules may be provided in kit form having various interchangeable component parts that may be assembled to meet the needs of a variety of circuit protectors. Such kits may be assembled quickly by hand and without tools due to snap-fit connections, for example, of such component parts, thereby providing a convenient and low cost monitoring assembly for circuit protectors. Modular construction and assembly of the monitoring modules, mounting elements and contact arms permits wide application of the monitoring modules to existing electrical systems having fuses of various sizes, shapes and configurations. When used in a circuit protector management system 112 such as that described above to communicate signals to the overview and response dispatch system 118, the monitoring modules and monitoring assemblies provide an effective monitoring status and detection scheme for an electrical system having a variety of different types of circuit protectors.

Figure 6:
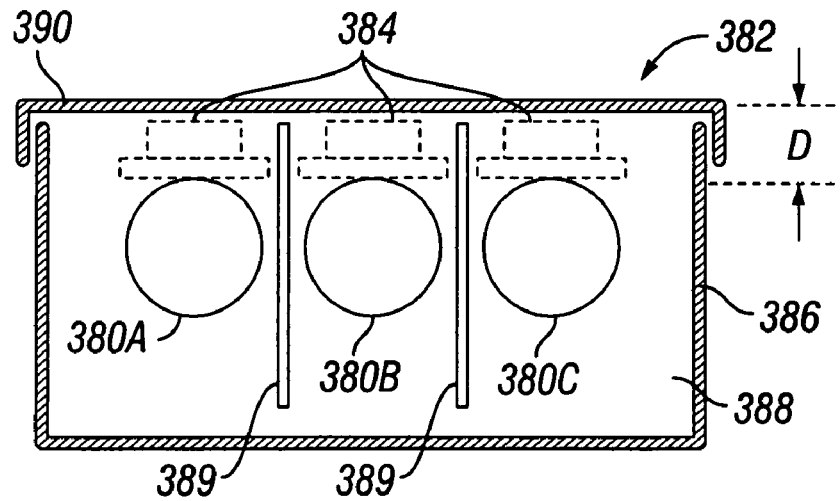
FIG. 6 illustrates a circuit protector enclosure and a monitoring module adapted to fit within the enclosure.

While the modules described above may be effectively used on a variety of circuit protectors in electrical systems, they are disadvantaged for certain circuit protectors, particularly those that are housed within protective enclosures. For example, FIG. 6 illustrates circuit protectors 380A, 380B, and 380C situated within an enclosure 382, and a monitoring module 384 that is adapted to fit within the enclosure. As illustrated in FIG. 6, the enclosure 382 may be a three phase device that houses three circuit protectors 380 for each current phase. It is contemplated, however, that single phase or polyphase embodiments having varying numbers of circuit protectors 380 may alternatively be provided.

The enclosure 382 may be fabricated from metal in one embodiment and may be formed into a box-like base 386 defining a compartment or cavity 388 therein that receives and contains the circuit protectors 380. A cover or lid 390, which may also be fabricated from metal, may be coupled to the base 386 and close the compartment 388. The lid 390 may be, for example, entirely removable from the base 386, may be hingedly attached to the base 386, or may be otherwise connected to the base 386 and movable relative to the base 386 to expose the compartment 388 for installation, service and repair of the circuit protectors and termination structure.

The base 386 may include conductive clips, terminations, and the like to complete electrical connections through the circuit protectors 380, which may be overcurrent protection fuses in an exemplary embodiment. The base 386 may also include insulative barriers 389 to separate the circuit protectors 380 from one another and to prevent accidental shorting of the circuit protectors 380 in use. The enclosure 382 may therefore sometimes be referred to as a fuseholder, a fuse box, a fuse block, etc. It is appreciated, however, that non-fuse circuit protectors are also sometimes enclosed in housings, boxes, blocks and panels as is known in the art. It is appreciated that non-metallic enclosures may also be provided in other embodiments.

Particularly for metal enclosures, however, applicable electrical standards, such as Underwriter's Laboratories (U.L.) Standards 67, 98 and 508 requires a minimum separation, gap or clearance, designated as D in FIG. 6, between an upper surface of the circuit protectors 380A, 380B, and 380C and an inner surface of the lid 390. The minimum clearance D is provided for safety reasons between conductive portions of the circuit protectors 380 and the grounded metal surfaces of the lid 390. The spacing D that is required by such standards is dependent on the voltage rating of the circuit protectors 380, and exemplary values of D according to exemplary standards and voltage ratings are set forth below in Table 1.

TABLE 1

| Minimum D Spacing to Grounded Metal | | |
| --- | --- | --- |
| Standard | Product Rating 250 V | Product Rating 600 V |
| UL 67 | ½ inch | 1 inch |
| UL 98 | ½ inch | ½ inch |
| UL 508 | ½ inch | ½ inch |

The module 350 shown in FIG. 5, for example, is generally ill equipped for use on a circuit protector 380 in the enclosure 382 because a height of the module 350 when connected to the circuit protectors 380 would extend well beyond the clearance D that is provided in the enclosure 382. The module 350 would therefore interfere with and/or prevent the lid 390 from closing. Especially when the enclosure 382 is provided to protect the circuit protectors 380 from harsh operating environment that could impair the operation and reliability of the circuit protectors 380 if they were otherwise exposed, any interference with proper closing of the lid 390 is undesirable. Different modules 384, shown in phantom in FIG. 1, that have a lower profile to fit within a relative small clearance D are therefore needed.

Figure 7:
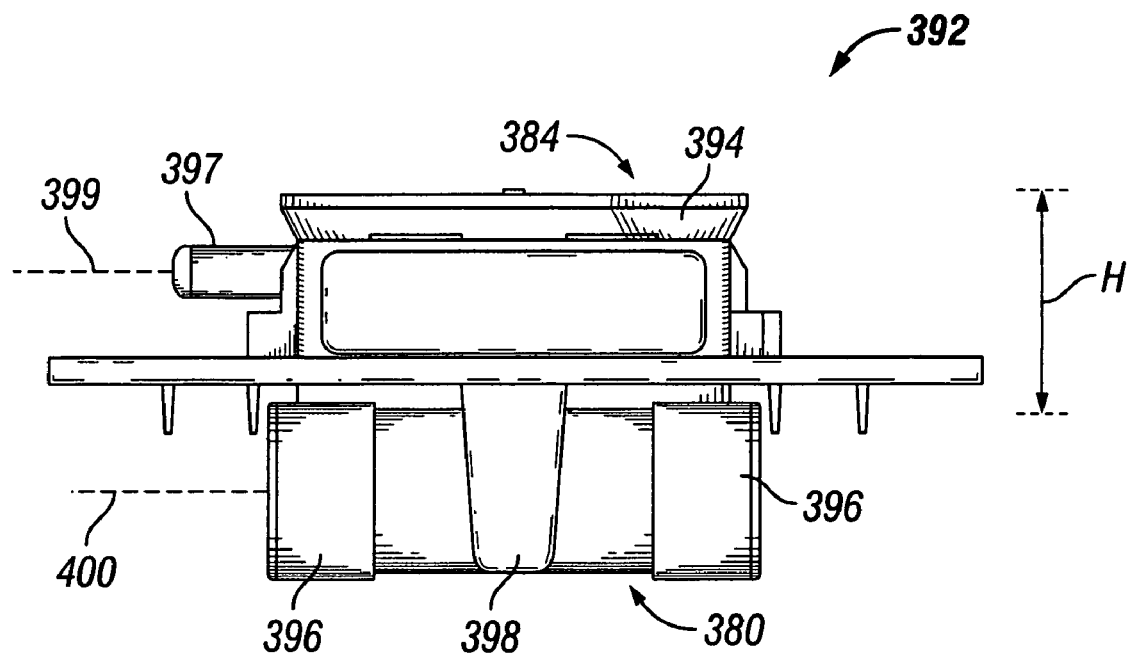
FIG. 7 illustrates the circuit protector and monitoring module shown in FIG. 6.

FIG. 7 illustrates a circuit protector monitoring assembly 392 including a module 384 and a circuit protector 380. Like the modules described above, the module 384 may include a nonconductive housing 394 that may be provided with a sensor board, and optionally may be provided with a communications board if the module 384 is configured as a communications module. Also like the modules described above, the module 384 may include contact arms (not visible in FIG. 7) that establish a parallel electrical connection to the conductive terminal elements 396 of the circuit protector 380 so that the operating state of the circuit protector 380 may be monitored, and a mounting element 398 that allows for retrofit installation to the circuit protector 380 with, for example, snap-fit engagement that does not require tools.

Unlike the module 350 shown in FIG. 5, for example, the module 384 has a relatively low profile height H measured from an upper surface of the circuit protector. The low profile height H is generally less than the clearance D shown in FIG. 6 so that the module 384 may occupy and fit within the clearance D above the circuit protector within the enclosure 382 (FIG. 6) without interfering with the lid 390 (FIG. 6). That is, considering the values of Table 1, for example, H in an exemplary embodiment may be selected to be generally less than 1 inch to satisfy applicable standards. To achieve the low profile H, and also to facilitate signal transmission from inside the enclosure 382, an antenna 397 projects outwardly from the housing 194 and extends along a generally linear axis 399 that is parallel to the longitudinal axis 400 of the circuit protector 380. The parallel axes 399, 400 of the antenna 397 and circuit protector 382 provides for a height reduction in the dimension H as compared to embodiments, for example, wherein the antenna axis and the circuit protector axis are perpendicular.

Figure 8:
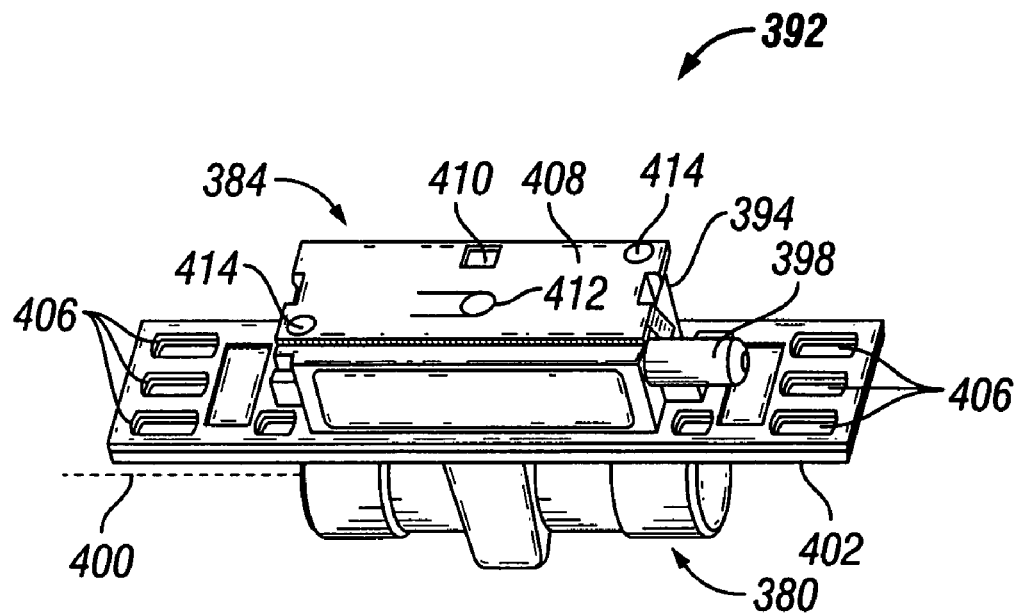
FIG. 8 is a top perspective view of the assembly shown in FIG. 7.

As best shown in FIG. 8, the housing 394 may further be provided with a non-conductive touch safe cover portion 402 proximate to but spaced from the circuit protector 380. The touch safe cover portion 402 may be substantially rectangular and may generally extend well beyond the longitudinal length and lateral width of the circuit protector 380, thereby providing a relatively large surface area overlying the circuit protector 380. The cover portion 402 may be a generally planar member as shown, and may extend generally parallel to the axis 400 of the circuit protector 380. The larger surface area of the touch safe cover portion 402 prevents a user from inadvertently contacting conductive portions of the circuit protector 380 and provides a degree of safety in that a human may safely touch the module housing 394 and the cover portion 402 generally without risk of electric shock. The cover portion 402 may be sized and dimensioned to extend across all open areas in the compartment 388 of the enclosure 382 (FIG. 6) so that no energized components are exposed and accessible when the enclosure lid 390 is opened. As illustrated in FIG. 8, the cover portion 402 may be provided with one or more ventilation openings 406 to facilitate airflow to the circuit protector 380 in use.

The module 384 may also be provided with a cover 408 that is positionable relative to the housing 394 to provide access to interior portions of the module 384. As shown in FIG. 8, a light pipe 410 may extend through the surface of the cover 408 for local fuse identification of the circuit protector state, and a switch actuator 412 such as a push button may extend through the cover 408. The light pipe 410 may provide for transmission of light from an illuminated LED on a circuit board internal to the module 384. The actuator 412 may control a switch for module testing or reset purposes. Additionally, fasteners such as set screws 414 may securely retain the cover 408 to the housing 394 in a closed position.

Figure 9:
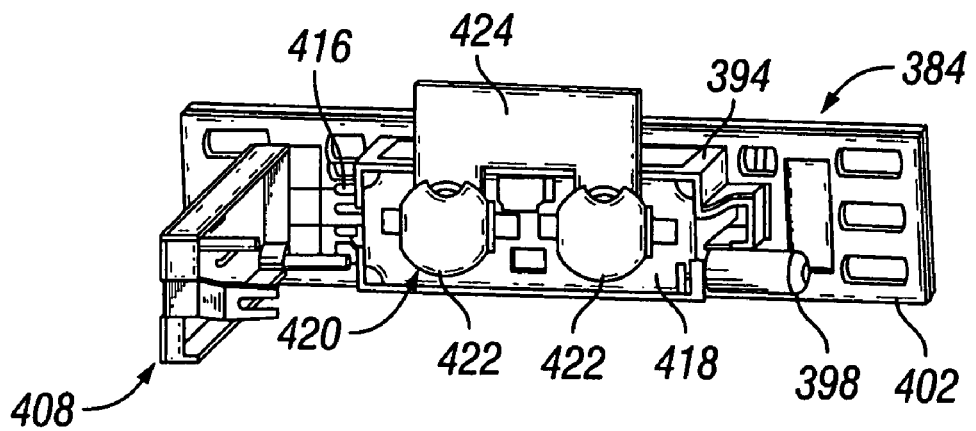
FIG. 9 is a top perspective view of the assembly shown in FIG. 7 with the cover opened.

FIG. 9 illustrates the cover 408 in an open position wherein the set screws are released and the cover 408 is rotated about a hinge 416 at one end thereof. When so opened, the cover 408 provides clear access to an interior 418 of the housing 394. As shown in FIG. 9, a communications board 420 may be located just beneath the cover 408, and the communications board 420 may include a processor and a transmitter (not visible in FIG. 9), and multiple batteries 422 powering the processor and the transmitter. The batteries may be connected in parallel to collectively power the communications board 420, and the batteries 420 are positioned so that they are fully accessible for replacement once the cover 408 is opened.

In an exemplary embodiment, each of the batteries may be a BR1225 Poly-carbonmonofluoride Lithium Coin Battery, manufactured by Panasonic Corporation of Secaucus, N.J. having an overall thickness measured in a generally perpendicular direction from a surface of the board 420 of about 2.5 mm, and an overall diameter of about 12.5 mm. The relatively small size of the batteries in part provides for a compact size of the housing 394 that allows the module 384 to fit in the clearance D (FIG. 6) of the enclosure 382. As illustrated in FIG. 8, the batteries 422 may be arranged side-by-side in a generally coplanar relationship to the surface of the board 420, allowing for the low profile height H (FIG. 7).

An insulative battery tab 424 fabricated from a polyethylene film or other equivalent materials may be provided that prevents electrical connection of the batteries 422 to the board 420 unless removed by a user. The module 384 may accordingly be packaged and shipped with the batteries installed to a site of installation without risk of the batteries draining.

Figure 10:
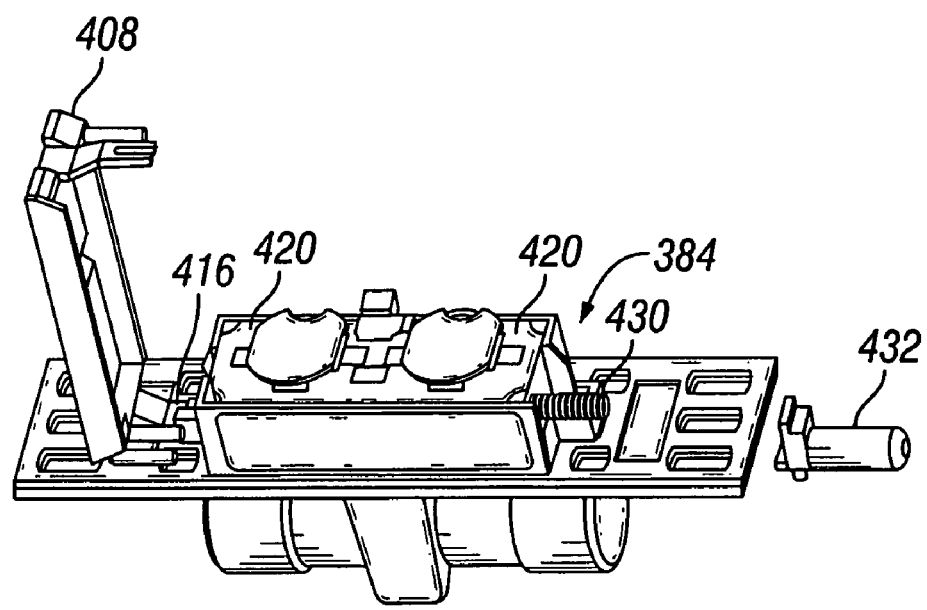
FIG. 10 is a side perspective view of the assembly shown in FIG. 9 with parts removed.

FIG. 10 illustrates additional aspects of the module 384, and in particular illustrates the antenna construction. As shown in FIG. 10, a helical antenna 430 may extend from an end of the communications board 420. The helical antenna 430 extends for a number of turns along the axis 399 (FIG. 7) and in one embodiment is a ⅛ wave guide antenna. The antenna 430 may be fabricated from brass spring temper wire in a known manner, and provides for an increased signal transmission and reception capability in a smaller physical space than other known, non-helical antenna constructions. A protective shroud or shield 432 may be fabricated from plastic or another non-conductive material and fitted over the antenna 430 to prevent accidental contact with the antenna 430 that may damage it. The shield 432, however, does not physically touch the antenna 430 and does not affect its signal transmission capabilities.

Figure 11:
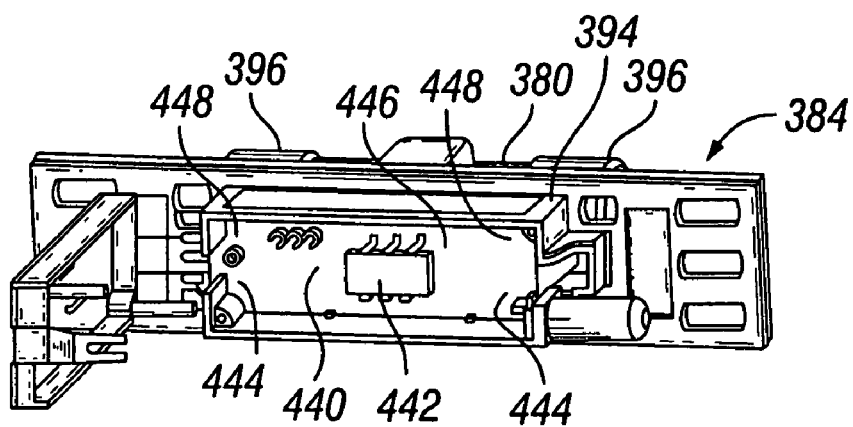
FIG. 11 is a top view of the assembly shown in FIG. 10 with parts removed.

FIG. 11 illustrates the module 384 with the communications board 420 (FIGS. 9 and 10) removed. A sensor board 440 may be located beneath the communications board in the housing 394. The board 440 may include voltage sensing circuitry and the like that may include an optoisolator 442 for example. In such an embodiment, the sensor board 440 may include first and second portions optically isolated from one another. More specifically, the sensor board 440 may include high voltage portions 444 at each opposing end that interface with the terminal elements 396 of the circuit protector 380 at voltages up to 600V, for example. Meanwhile, a low voltage portion 446 of the board 440 extends between the high voltage portions and operates at comparatively lower voltage of 3V, for example. To facilitate isolation of the high and low voltage portions 444 and 446 of the sensor board, electrical insulation materials 448, such a silicon caulking, may be provided on the surface of the board at its end portions. For example, GE 162 electrical grade silicon caulk, a caulk such as a Loctite 5088 compound, or equivalent materials may be utilized. Alternatively, conformal coatings or potting compounds applied to substantially the entire board may be utilized.

When the circuit protector 380 operates to interrupt the current path through the circuit protector 380, which may arise through operation of a fuse element in the circuit protector 380, a voltage drop across the terminal elements 396 may be detected, causing the optoisolator 442 to latch high, ultimately resulting in an input signal to the communications board 420 for wireless transmission to a remote location.

The sensor board 440 and the communications board 420 may be generally parallel to one another and may extend parallel to the axis 400 (FIG. 7) of the circuit protector 380. That is, the major surfaces of each board 440 and 420 extend generally perpendicular to the dimension H (FIG. 7) such that only the thickness of each board, as opposed to the dimensions in the plane of each board, contributes to the height H of the module 384 as it is assembled. Also, the plane of the circuit boards 440 and 420 extend parallel to the cover 408 on the top of the module 384 and perpendicular to the side walls of the module housing 394 that extend in the direction of dimension H. The parallel boards when stacked in such a manner offer considerable reduction in the dimension H in comparison to the module 350 of FIG. 5, for example, wherein the major surfaces of the circuit boards are oriented vertically rather than horizontally as in the module 384.

It is anticipated that signal ports and interface plugs may be utilized to connect multiple modules 384 to one another as described above in relation to FIGS. 3 and 4 if desired. Thus, the modules 384 may be configured as sensor modules or communication modules. In the case of sensor modules, for example, the communications board, or some of the components thereof such as the transmitter and the antenna may not be required and may be omitted.

Figure 12:
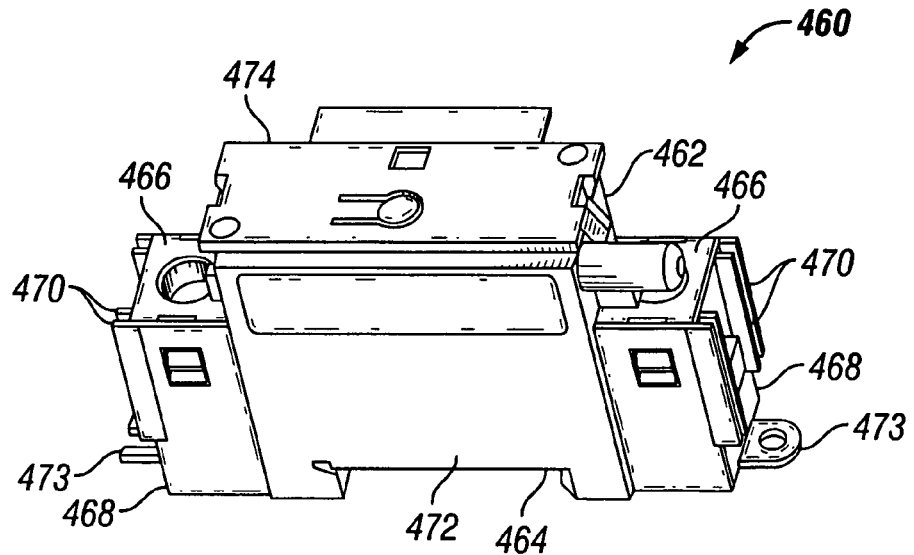
FIG. 12 is a perspective view of another embodiment of a monitoring module.

FIG. 12 is a perspective view of another embodiment of a monitoring module 460 that, instead of directly attaching a circuit protector, may be attached to a DIN rail upon which a circuit protector may be mounted.

The module 460 may include a nonconductive housing 462 that may be provided with a sensor board, and optionally may be provided with a communications board if the module 384 is configured as a communications module. The housing 462 may be formed with a DIN rail slot 464 for mounting of the module 460 on the DIN rail. The DIN rail slot 464 may dimensioned for insertion onto, for example a 35 mm DIN rail known in the art. Panel mounting flanges 473 are also provided in either side of the housing 462 for alternatively mounting the module to a panel using known fasteners. Box lugs 466 may also be provided in the housing 462 that accept, for example, stripped ends of connecting wires. Using the box lugs 466, the module 460 may be connected in parallel to an existing circuit protector.

Additionally, and as illustrated in FIG. 12, the side edges 468 of the housing 462 may include opposed pairs of vertically oriented flanges 470 spaced from one another and projecting away from the box lugs 466. The flanges 470, sometimes referred to as fins or wings, provide an increased surface area of the housing 462 in a horizontal plane extending between the between the box lug terminals 466 on the opposing side edges 468 of the housing 462 than would otherwise occur if the flanges 470 were not present. That is, a peripheral outer surface area path length extending in a plane parallel to the lower DIN rail slot 464 includes the sum of the exterior surface dimensions of one of the pairs of flanges 470 extending from one of the lugs 466, the exterior dimensions of the respective front or rear panel 472, 474 of the housing 462, and the exterior surface dimensions of the opposing flanges 470 extending to the opposite lug 466.

Figure 13:
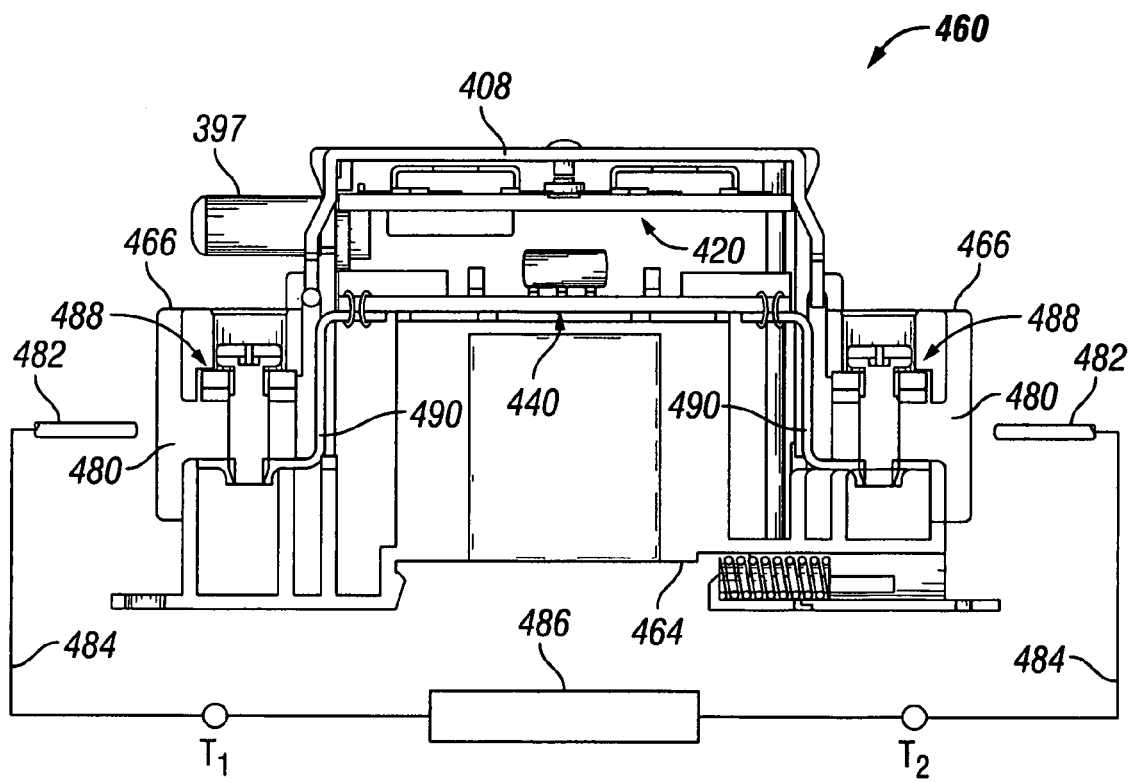
FIG. 13 is a side sectional view of the module shown in FIG. 12.

FIG. 13 is a side sectional view of the module 460 wherein the box lugs 466 are depicted in more detail. The lugs define access ports 480 that receive ends 482 of connecting wires 484. Opposing ends of the wires 484 are connected to the terminals T1 and T2 of a circuit protector 486 that may be an overcurrent protection fuse to connect the circuit protector 486 in parallel with the circuit protector 380. Box clamp terminals 488 are provided in each box lug 466 and set screws in the terminals may be turned to retain or release the wire ends 482 from the terminals 488.

Connecting terminals 490 are also provided in each box lug 466 to complete electrical connections between the wire ends 482 and the sensor board 440. The sensor board 440, the communications board 420, the antenna 397 and the cover 408 are provided substantially as described above with similar benefits. The sensor board 440 extends generally parallel to the DIN rail slot 464 and the radio board extends generally parallel to the sensor board 440, resulting in a relatively compact and low profile arrangement in contrast to, for example the module 350 of FIG. 5 wherein the circuit boards vertically arranged.

It is anticipated that signal ports and interface plugs may be utilized to connect multiple modules 460 to one another as described above in relation to FIGS. 3 and 4 if desired. Thus, the modules 460 may be configured as sensor modules or communication modules. In the case of sensor modules, for example, the communications board, or some of the components thereof such as the transmitter and the antenna may not be required and may be omitted.

Using the modules 316, 350, 384 and 460 described above, versatile, relatively low cost, expandable and adaptable circuit protector monitoring systems are provided that may be retrofitted to existing electrical systems without modifying the electrical system and infrastructure. It is understood, however, that in future equipment, or perhaps for smaller electrical systems, the monitoring, communications, and management components could be built-in to the electrical system and circuit protector products themselves.

While the foregoing embodiments of modules and circuit protectors 108 are described in the context of fuses, similar technologies and methodologies could be employed with other types of circuit protectors such as, for example, circuit breakers and switches to detect operation of the devices to more efficiently locate and reset tripped breakers and opened switch paths, as well as to facilitate monitoring, diagnostics and troubleshooting of the electrical system.

D. The Signal Transmission System

Figure 14:
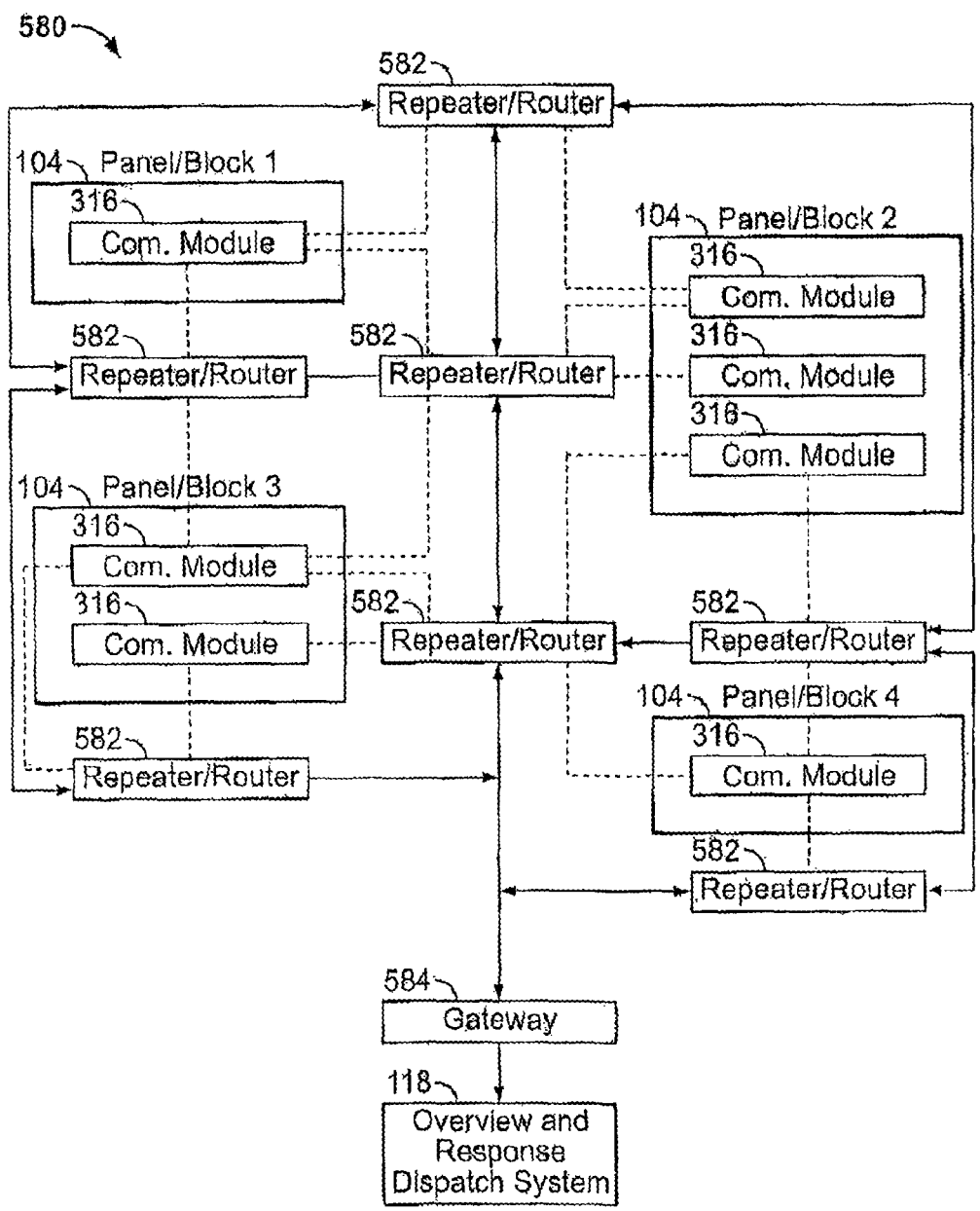
FIG. 14 is a schematic block diagram of a networked circuit protection signal transmission system that may be used in the circuit protector management system of FIG. 1.

FIG. 14 schematically illustrates an exemplary signal transmission system 580 for use with the circuit protector management system 112 shown in FIG. 1 and the method 130 shown in FIG. 2. A plurality of circuit protector panels 104 are distributed throughout the electrical system, and each circuit protector panel 104 in the electrical system that is to be monitored includes, for example, a monitoring assembly such as those described above for transmitting data signals corresponding to the operational state one or more circuit protectors, such as fuses, in the panels 104. In the manner described above, the modules 316, 350, 384 and 460 may generate a wireless data signal or data packet when one of the fuses associated with the monitoring assemblies opens.

The wireless data signals from the modules 316, 350, 384 and 460 (collectively designated as 316 in FIG. 14) may be received, for example, by one or more repeater/router elements 582 located within the transmission range of the communications module transmitter 340. In an exemplary embodiment, the repeater/router elements 582 may be wireless, radio frequency transmission devices or equivalent devices that receive, for example, a digitally transmitted RF data signal from the communications modules and forward the data signal to a signal collection and conditioning device, referred to herein as a gateway device 584. The gateway device is, in turn, in communication with the overview and response dispatch system 118. Alternatively, the repeater/router elements 582 may be another electronic device that functions to feed transmitted data from the one of the communications modules 316, 350, 384 and 460 to the gateway device 584. For example, USB, serial port connections or other connection means and their equivalents may be utilized to interconnect the repeater/router elements 582 and the gateway device 584.

In an exemplary embodiment, a plurality of repeater/router elements 582 are provided around and about the various panels 104, and the repeater/router elements 582 form a mesh network defining multiple signal paths to forward signal transmissions from the communication modules to a single gateway device 584 in communication with the overview and response dispatch system 118. Repeater/router elements 582 and mesh network configurations are commercially available from, for example, RF Monolithics, Inc. of Dallas, Tex. Many different mesh topologies are known and may be employed, including but not limited to star configurations, ring configurations, cloud configurations, linear configurations and the like. The mesh network may be algorithmically based and configured to meet specific needs for specific installations.

The network of repeater/router elements 582 in one embodiment is self-configuring and self healing with autorouting and rerouting capability as the network changes, and is highly scalable wherein thousands of circuit protectors may be monitored in the circuit protector management system 112. Considering that the various panels 104 may be located in different locations, and even in different buildings, the management system 112 is versatile and adaptable to existing electrical systems 100, and is accommodating to addition or subtraction of additional electrical loads and circuit protectors in the electrical system.

While a plurality of repeater/router elements 582 are illustrated in FIG. 14, it is understood that as few as one repeater/router element 582 could be provided in an alternative embodiment. Likewise, more than one gateway device 584 could be employed if desired.

The gateway device 584 may be a network based computer server system, a personal computer, a computer workstation, a programmable logic controller or other electronic controller, a processor-based hand held device or another electronic device or equivalent thereof that may receive, condition, process or interpret signals from repeater/router elements 582, and communicate the signals to the overview and response dispatch system 118.

Figure 15:
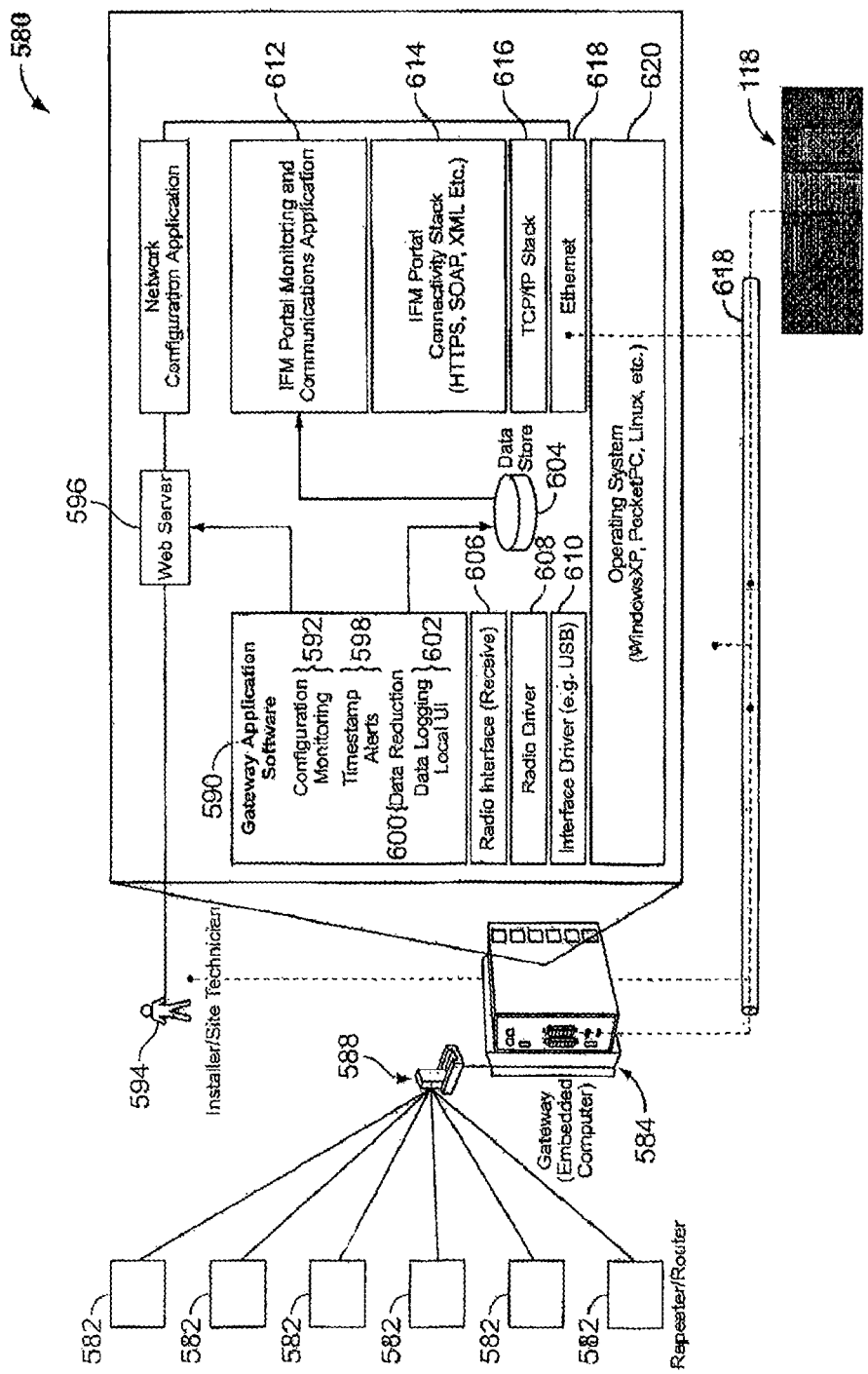
FIG. 15 schematically illustrates the signal transmission system shown in FIG. 14.

FIG. 15 schematically illustrates the signal transmission system 580 providing data communication between the repeater/router elements 582 and the overview and response dispatch system 118 via the gateway device 584.

As shown in FIG. 15, the gateway device 584 may be an embedded computer device including a receiver 588 for receiving, for example, wireless data transmission from the repeater/router elements 582 when one or more of the status elements, such as the monitoring modules 304 described above signal the repeater/router elements 582 of an operated circuit protector that has isolated portions of electrical circuitry in an electrical system. The receiver 588 may be a part of the gateway device 584 or may be separately provided and interfaced with the gateway device 584 to receive incoming signal transmissions from the repeater/router elements 582.

Data packets may be transmitted repeatedly from the circuit protector monitoring assemblies and/or the repeater/router elements 582 within specified time periods to ensure that the data packets are completely received, processed, and optionally acknowledged by a gateway device 584 and/or the overview and response dispatch system 118. Repeated transmission of data signals avoids collision of signals when more than one of the circuit protectors operates at approximately the same time. Also, the repeater/router elements 582 may add a routing code, a time stamp or other information to the data packet so that the overview and response dispatch system 118 may monitor the communication system and signal path between the monitoring modules and the overview and response dispatch system 118.

As shown in FIG. 15, the gateway device 584 includes gateway application software 590 for processing incoming data signals through the repeater/router elements 582. The gateway application software may be implemented on, for example a Linux, UNIX or Windows-based operating system and equivalents thereof as those in the art will appreciate.

The application software 590 may include, for example, configuration and monitoring algorithms 592 and interactive graphic user displays for assisting the monitoring assembly installers and system or site technicians 594 with setting up, testing and troubleshooting the communications between the status elements, the repeater/router elements 582 and the gateway device 584. The installers or technicians 594 may be logged on to the gateway device 584 at a remote location from the gateway device through, for example, a web server 596 connected to the gateway device 584, or installers or technicians may work directly with a local user interface associated with the gateway device 584 itself. More than one installer or technician could log on to the gateway device 584 for access to the application software 590 to supply and receive necessary information to install, maintain, or modify the configuration of the monitoring components and the signal transmission components associated with circuit protectors.

Using the configuration and monitoring algorithms 592 and interactive graphic user displays, status elements and repeater/router elements may be deemed, considered, determined or identified by the system according to an operating mode thereof. For example, applicable monitoring modes for the status elements may include a "registered" status wherein the status elements are authorized and compatible with the gateway device; a "discovered" status wherein the status element is installed but not activated to communicate with the management system; an "activated" status wherein the status elements are associated with a specific circuit protector and communicating with the management system; a "suspended" status wherein the status element has been caused not to function; a "deactivated" status wherein the element is uninstalled and not associated with any circuit protector; or an "offline" status wherein the status element is activated but not reporting to the management system 112. The signal transmission components, including but not limited to the repeater/router elements 582, may likewise be designated and identified by the management system.

Additional characterization, grouping, or labels of the status elements for the circuit protectors may be provided for informational purposes to provide an overview of the entire management system and status of the monitoring and signal transmission components as the system is expanded, contracted, or changed in use, and as more electrical loads or configuration of the electrical system are changed or adapted over time. The operating modes may be automatically detected by the gateway device 584, or may be manually entered by installers, technicians, and service personnel for the status elements. The gateway device 584 may therefore intelligently manage the addition or subtraction of circuit protector status elements and repeater/router elements 582 to and from the circuit protector management system 112.

Timestamp alert algorithms 598 and associated displays may also be included in the application software 590 for inspection and maintenance purposes wherein the communications systems between the status elements, the repeater/router elements 582 and the gateway device 584 are periodically verified to ensure operation of the monitoring and communication components in the circuit protector management system 112. As one example, the circuit protector status elements and/or the repeater/router elements 582 may be programmed to communicate or report with the gateway device 584 on a periodic basis or interval, sometimes referred to as a watchdog interval, and the gateway device 584, through the application software 590, could monitor the operating status or health of the management system by comparing signals received from the status elements and the repeater/router elements with information entered into the system, via the configuration and monitoring algorithms and displays 592, of the status elements and repeater/router elements known to be in the circuit protector management system 112. If, for example, one of the repeater/router elements 582 or one of the circuit protector status elements does not report in a predetermined time frame, an error flag may be set and alert may be generated to the installer/site technician 594, either directly from the gateway device 584 or indirectly through the overview and response dispatch system 118. The timestamp alert algorithms 598 and the configuration and monitoring algorithms 592 may then be accessed by site technicians 594 to diagnose and troubleshoot the circuit protector management system 112.

Data reduction algorithms 600 may be included in the application software 590 for processing signal transmissions from the repeater/router elements 582 before communicating with the overview and response dispatch system 118. For example, the gateway device 584 may filter incoming data signals and identify duplicate signal transmissions that may occur, for example, when more than one of the repeater/router elements 582 transmits the same signal to the gateway device, or as another example, when the same status element signals the repeater/router elements 582 more than once to avoid for example, collision of data signals. Duplicate signals may be discarded or deleted by the gateway device 584 prior to communicating signals to the overview and response dispatch system 118.

The data reduction algorithms 600 may also reduce or eliminate information from the data signals that are not necessary for the overview and response dispatch system 118 functionality. For example, messaging protocol information pertinent to the radio frequency transmission of the data signals but not pertinent to the network messaging protocol for communication with the overview and response dispatch system 118, may be stripped, eliminated, or deleted from the data signals before transmission to the overview and response dispatch system 118.

Data logging algorithms 602 and associated displays may also be included in the gateway application software 590 for supplying and receiving information and data and generating reports of management system activity. Such information and reports, as explained above, could be a useful tool for proactive management of an electrical system to identify issues in the electrical system that may cause operation of one or more circuit protectors to isolate portions of the circuitry, and perhaps allow for technicians 594 to take steps to control and manage the electrical system in a way that opening of the circuit protectors is avoided altogether, which is especially advantageous in critical applications, such an electrical system for a hospital.

The data logging algorithms 602 and displays could also be used to initiate special procedures responsive to real time operation of the electrical system, such as shutting down certain machines or portions of the circuitry at high risk when one or more of the circuit protectors operates. Such procedures may be particularly appropriate, for example, when one phase of a three phase electrical power supply becomes isolated or interrupted due to an operated circuit protector, and a machine or load is temporarily powered by only two phases of electrical current.

Each of the configuration and monitoring algorithms 592, the timestamp alert algorithms 598, the data reduction algorithms 600 and the data logging algorithms 602 are interconnected with a database 604 or memory storage medium needed to store inputted, collected, and received data, operating parameters and settings, and the machine readable operating software codes and algorithms, etc. that the gateway device 584 may require.

A communications interface 606, a communications driver 608, and interface drivers 610 may also be provided in the gateway application software 590 to provide communication between operative components in the circuit protector management system 112.

The gateway device 584 may also perform authentication, verification, or security algorithms to ensure the integrity of the management system communications, as well as perform diagnostic, testing, and troubleshooting procedures to ensure proper installation and operation of the circuit protector status elements and repeater/router elements 582 in the overall circuit protector management system 112.

In an exemplary embodiment, a portal monitoring and communications application 612 may be provided for further processing of data signals to convey information to the overview and response dispatch system 118. The communications application 612 may include protocol algorithms 614 to convert message data from the incoming radio frequency data transmission protocol, for example, to a preferred network messaging protocol, including but not limited to HTTPS, SOAP, and XML protocols and their equivalents known in the art, and internet protocol algorithms 616 for transmitting the network messaging protocol data packets to the remote overview and response dispatch system 118 via, for example, an Ethernet connection 618.

In an exemplary embodiment, the incoming radio frequency data protocol is a byte oriented protocol having multiple bits representative of information of interest. For example, the status elements may transmit digital data signals including bits corresponding to a unique radio identifier, a manufacturer serial number for the status element, a device type code for the circuit protector, a location or address code for the circuit protector, a power/control code, an equipment identification code, and state parameter codes such as testing codes, faults codes, and codes pertaining to operating conditions of the circuit protector and/or circuitry associated with the status elements. The data signals may also include codes relating to the ambient environment of the circuit protector or the associated electrical system and loads, such as temperature codes, vibration codes, displacement codes, mechanical stress codes, mechanical strain codes, acoustical emission codes, noise codes, thermal imagery codes, electrical resistance codes, pressure codes, humidity codes and video surveillance codes.

The repeater/router elements 582 may add bits to the signal protocol corresponding to a serial number of the respective repeater/router element, a device type code for the repeater/router, a wireless address for the repeater/router, a data packet sequence number, a location code for the repeater/router, and state parameters pertaining to operating conditions of the repeater/router elements.

The gateway device 584 converts the radio frequency transmission protocol to a second, and different messaging protocol for transmission to the overview and response dispatch system 118. The second message protocol may also be byte oriented and include bits corresponding to the unique radio identifier, a serial number of an operated circuit protector, a device type code for the operated circuit protector, a location code for the operated circuit protector, a wireless address, an IP address for the gateway device, a time/date stamp, a software revision code for the gateway application software and/or the communications application loaded on the gateway device, a hardware revision code for the gateway device, a packet count, an error count, and a predetermined number of error codes. When received by the overview and response dispatch system 118, the gateway data message can be used to quickly determine operation of the circuit protectors, locate operated circuit protectors in the electrical system, and notify and summon responsible personnel and technicians for quickly re-energizing downed circuitry. Furthermore, all of the codes and data relating to signal events in the system are logged for future use, retrieval, study and analysis to evaluate the performance of the overall circuit protector management system 112.

While some exemplary message codes have been described, it is understood that other types of codes, information and data representative of circuit protector products and operating status may be included in alternative embodiments, and it is also recognized that less than all of the exemplary protocol bits and codes could be used in other embodiments of the signal transmission system 580. Implementation of the message protocols may be conventionally provided and is not specifically described in further detail herein.

The gateway application software 590 and the communications application 612 may run on a known operating system 620 loaded on the gateway device 584, including but not limited to Windows, PocketPC, and Linux operating systems and their equivalents known in the industry. Having now described the various operating algorithms functionally, programming of the modules to operate in the manner described may be conventionally provided by those in the programming arts without further explanation.

In an exemplary installation, the gateway device 584 may be located at the electrical system site, and the overview and response dispatch system 118 may be located remotely, although the overview and response dispatch system 118 could be located at the site of the electrical system as well.

Figure 16:
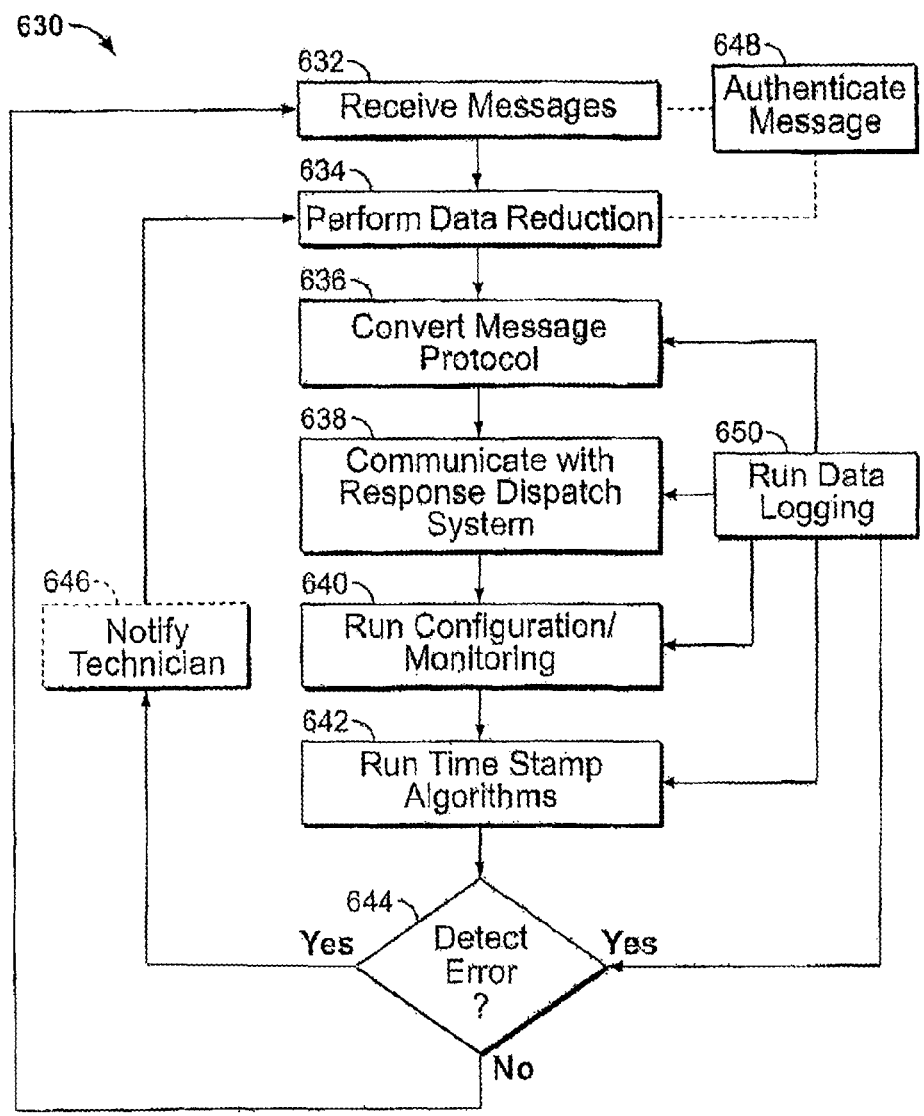
FIG. 16 is a method flowchart for the system shown in FIGS. 6 and 7.

FIG. 16 is a flowchart of a method 630 executable by the gateway device 584 in an exemplary embodiment. The gateway device 584 awaits signals from the repeater/router elements, and receives the signals 632 in any manner described above. Data reduction is performed 634 on the incoming signals in the manner described above, and the incoming message protocol is converted 636 to a second message protocol, different from the incoming message protocol. Once the message protocol is converted 636, the gateway device communicates 638 the converted data message to the remote overview and response dispatch system 118 for action or attention in the manner described above.

As appropriate or as needed, the gateway device runs 640 the configuration and monitoring algorithms and runs 642 the timestamp algorithms as described above. If an error is detected 644, the gateway device may notify 646 a technician and perform data reduction procedures 634 to prepare to send an error signal to the overview and response dispatch system. If an error is not detected 644 during the time stamp algorithms and procedures, the gateway devices reverts to a dwell state until another message is received 632 from the repeater/router elements.

Optionally, incoming messages may be authenticated 648 or other verification and security algorithms and procedures may be implemented to ensure the integrity of the system communications. Data logging procedures are run 650 as needed during operation of the gateway device 584, and data may be accessible by or be communicated to the remote overview and response dispatch system as desired.

Figure 17:
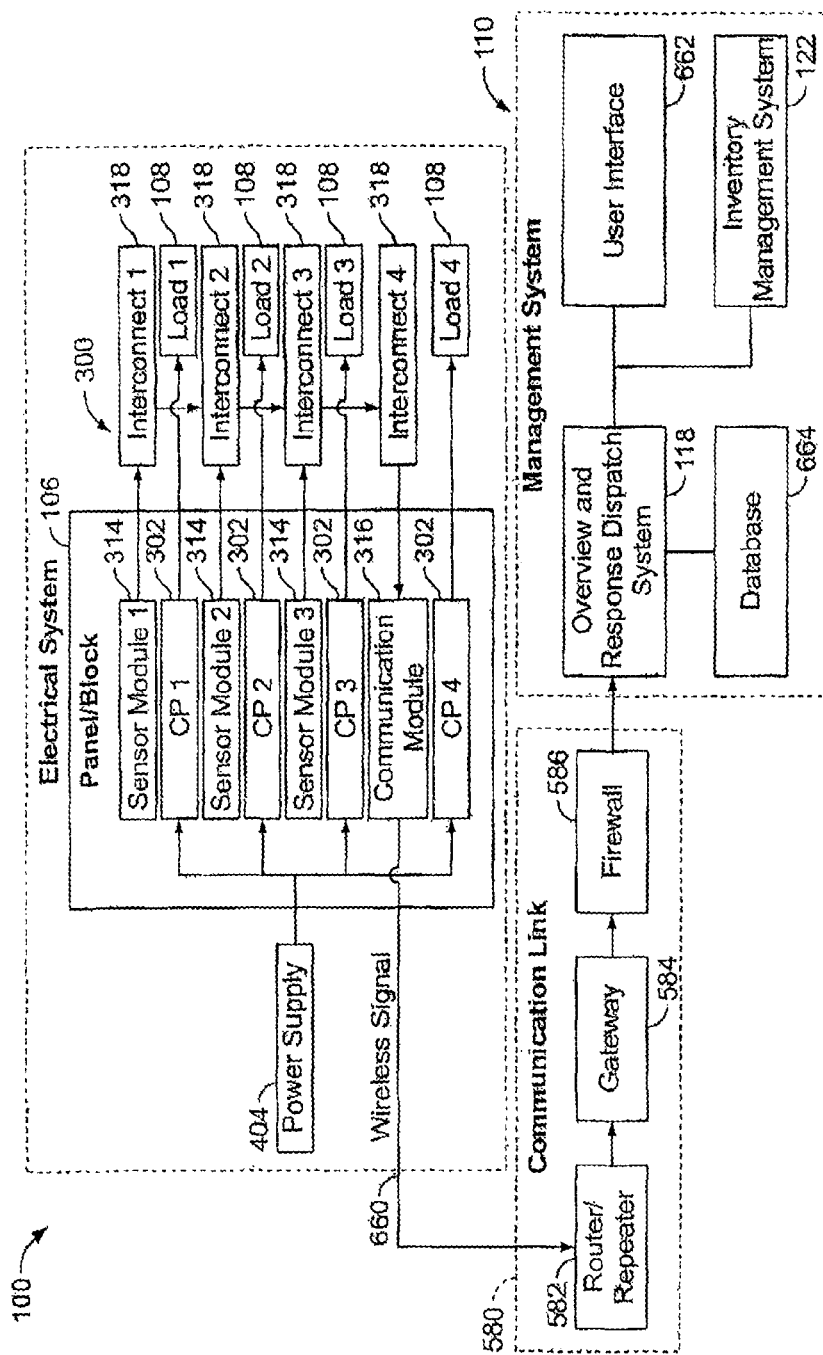
FIG. 17 schematically illustrates a further embodiment of the system shown in FIGS. 15-16.

FIG. 17 schematically illustrates the signal transmission system 580 connected to an electrical system 100 and the management system 112. The electrical system 100 includes a power supply or power supply circuitry 102 connected to multiple circuit protectors such as fuses 302 in a circuit protector panel 104. Each of the fuses 302 is associated with a sensor module or a communications module in accordance with one of the foregoing embodiments, and each of the fuses 302 is connected to an electrical load 106. The interface plugs 318 interconnect the sensor modules 314 to one another and to one of the communication modules in the manner described above. Due to the interconnection of the sensor and communication modules, when any of the fuses 302 operates to isolate any of the loads 106, a data packet is presented to the transmitter 340 of the associated communication module, and a wireless signal 660 is transmitted by the communications module. The wireless signal 660 is received and forwarded by at least one of the repeater/router elements 582 to the gateway device 584. The gateway device 584, protected by a firewall 586, then communicates the information to the overview and response dispatch system 118.

The management system 112 includes the overview and response dispatch system 118, a user interface or display 662 connected to the overview and response dispatch system 118, and may be in communication with the inventory management system 120 for automatic ordering of replacement fuses. A memory or database 664 may also be provided to log system activity and store needed information for the overview and response dispatch system. For example, the database 664 may be used to decode incoming data packet transmissions from the gateway device 584, and the user interface 662 may be used to present information to responsible personnel in tabular and graphic form with menu-driven displays described below. The database 664 may also be used for storage and retrieval of contact information for locating and summoning maintenance personnel.

Figure 18:
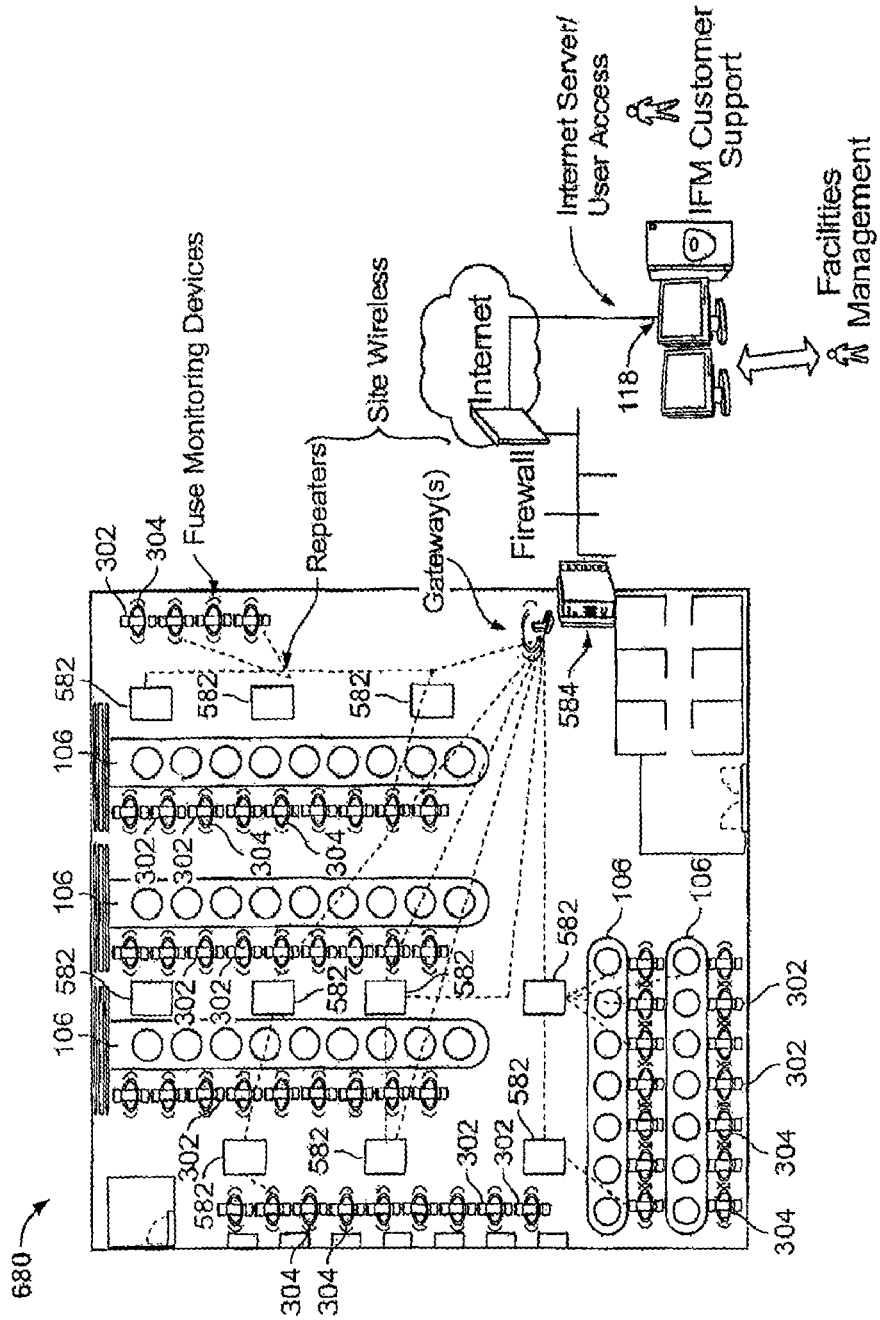
FIG. 18 is an exemplary schematic block diagram of an exemplary circuit protector management system utilizing the signal transmission system of FIG. 14 and connected to an electrical system.

FIG. 18 is an exemplary site diagram of an electrical facility 680 housing an electrical system having many circuit protectors 302 to be monitored in various panels 104 in the facility 680. Monitoring modules, whether communication modules or sensor modules as described above, are associated with circuit protectors such as fuses 302 scattered throughout the facility 680. A number of repeater/router elements 582 are also strategically located in different locations in the facility 680 within the operating range of the monitoring modules, and specifically the communications modules. The repeater/router elements 582, in turn, are in communication with a centralized gateway device 584 that communicates with the overview and response dispatch system 118 at a remote location via, for example, the Internet.

As FIG. 18 demonstrates, the management system can efficiently monitor a large number of fuses 302, and as the size and complexity of the facility 680 increases, the system is readily adaptable by adding additional monitoring modules 304 and repeater/router elements 582. The overview and response dispatch system 118 directly interacts with facilities management to provide real time system performance data and immediate information so that downed circuitry may be re-energized as quickly as possible.

Figure 19:
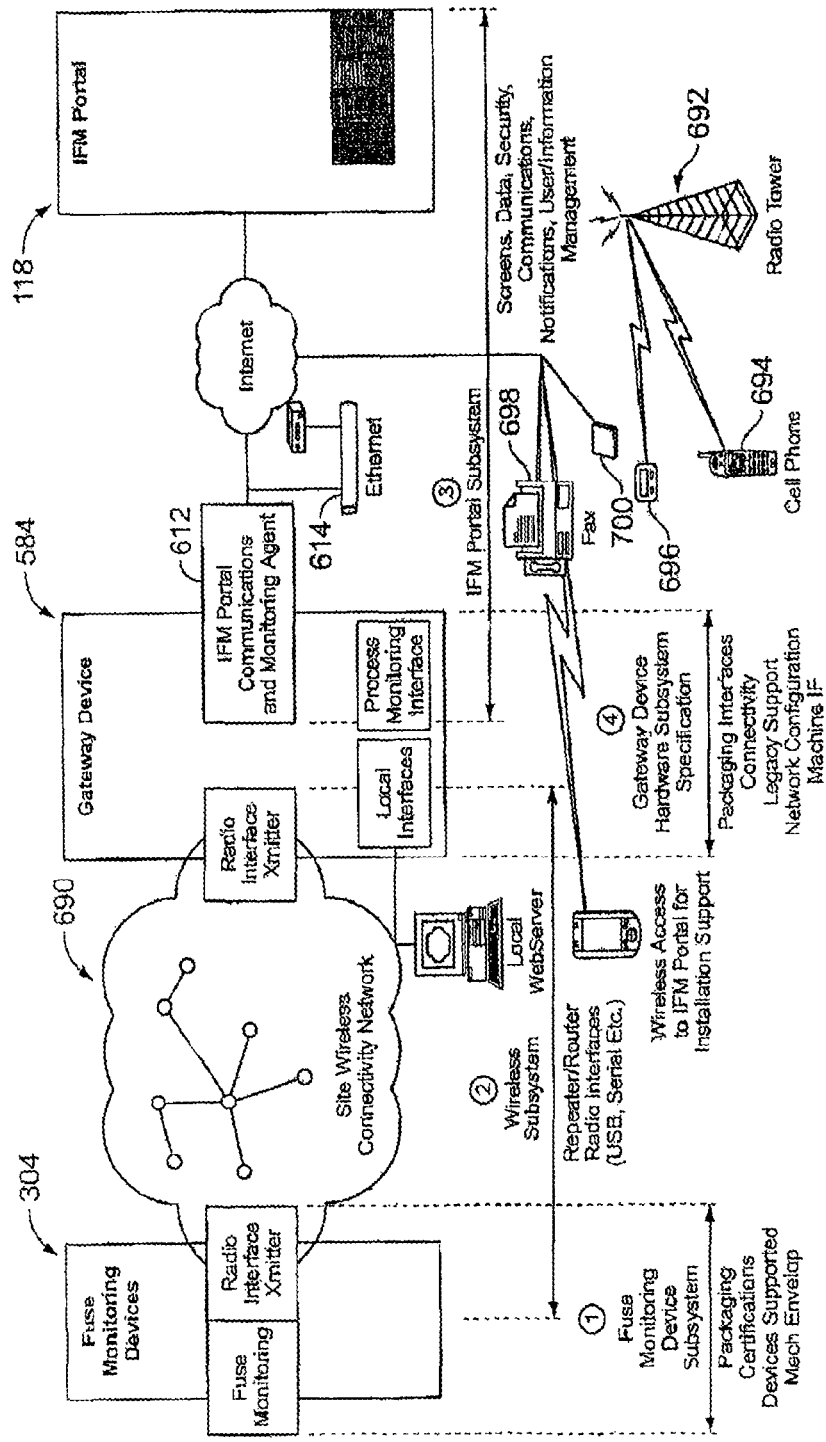
FIG. 19 is an exemplary site diagram of the electrical system shown in FIG. 11.

FIG. 19 further illustrates additional features of the management system shown in FIGS. 17 and 18 in one implementation thereof. The fuse monitoring modules 304, which may be any of the modules described above, are interfaced with a network 690 of repeater/router elements 582 that are, in turn, interfaced with the gateway device 584. The gateway device 584 may be connected to local network interfaces and process monitoring interfaces of, for example, the facility 680. The portal communications application 612 of the gateway device 584, implemented in software or machine readable code, processes incoming signals from the repeater/router network 690. After processing by the portal communications application 612, the gateway device 584 communicates with the Internet via an Ethernet connection 618 and ultimately with the overview and response dispatch system 118. In response to communications from the gateway device 584, the overview and response dispatch system 118 communicates with responsible personnel for the electrical system through the Internet and communication towers 692, for example, to contact designated personnel by phone 694, pager 696, facsimile 698, email 700, or via a customer web site to provide direction and information regarding operated circuit protectors and re-energizing circuitry.

E. Conclusion

The systems and processes described above are not limited to the specific embodiments described herein. Components of each system and each process can be practiced independent and separate from other components and processes described herein. Each component and process also can be used in combination with other components, systems and processes.

For example, while the communication modules 802 are described as being adapted for retrofit installation to existing circuit protectors, the functionality of the communication modules 802 could alternatively be built-in to circuit protector panels or other infrastructure, or into the circuit protectors themselves in other embodiments. Also, while the sensor and communication modules are described and illustrated for use with fuses, other types of circuit protectors providing overvoltage, overcurrent, overload, and short circuit protection, for example, may be monitored with appropriate modification of the modules.

Also, the foregoing circuit protector communication modules 802 and the monitoring and management system 112 may be implemented in whole or in part to meet the needs of a particular electrical system 100 or for cost management reasons. In other words, the communication modules 802 and the management system 112 need not include all of the described components, or perform all of the described functions set forth above.

As still another example, the communication modules 802 and the management system 112 could identify and determine operational status and data regarding the circuit protector and circuitry and communicate and transmit data to the overview and response dispatch system 118, but not communicate with an inventory management system.

It should now be apparent that the system components may be mixed and matched to generate varying systems which obtain the benefits of the present invention to varying degrees.

An embodiment of a circuit protector monitoring assembly is disclosed herein. The assembly comprises at least one circuit protector defining an interruptible current path therethrough upon an occurrence of specified current conditions through the interruptible current path; a status element connected in parallel with the circuit protector and adapted to sense an operating state of the current path and wirelessly transmit information regarding the operating state of the current path, the information including a circuit protector identifier and a circuit protector location; and the status element comprising a housing and an antenna projecting from the housing.

Optionally, the status element may occupy a clearance above the circuit protector that is generally less than one inch. The antenna may comprise a helical antenna. The circuit protector may have a longitudinal axis, and the antenna may extend generally parallel to the longitudinal axis. The circuit protector may be located in an enclosure having a lid, with the status element fitting between the circuit protector and the lid. The status element may comprise multiple batteries connected in parallel, with the batteries generally positioned in a plane extending parallel to the longitudinal axis. The status element may comprise a battery tab preventing electrical connection of the batteries.

Also optionally, the status element may comprises a housing and a hinged cover mounted to the housing. The housing may comprise a fin increasing a surface area of the housing. A touch safe cover portion may extend from the housing, and the cover portion may comprise at least one ventilation opening. The housing may also comprise a DIN rail slot. The status element may comprise a monitoring module mechanically and electrically connected to terminal elements of the circuit protector at a location exterior to the circuit protector, with the module adapted for retrofit installation to the circuit protector. The circuit protector may comprise a fuse, with the status element transmitting data related to operation of the fuse, and the data comprising a plurality of data bits selected from the group comprising a unique radio identifier, a manufacturer serial number for the status element, a device type code for the circuit protector, a location or address code for the circuit protector, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code. The status element may also comprise a circuit board interfacing a high voltage portion and a low voltage portion, and silicon caulking insulating and isolating the high voltage portion from the low voltage portion.

Another embodiment of a circuit protector monitoring assembly is also disclosed herein. The assembly comprises an enclosure and a lid collectively defining a closeable container for at least one circuit protector; at least one circuit protector situated within the enclosure and defining an interruptible current path therethrough upon an occurrence of specified current conditions through the interruptible current path; a status element connected in parallel with the circuit protector and adapted to sense an operating state of the current path and wirelessly transmit information regarding the operating state of the current path, the information including a circuit protector identifier and a circuit protector location; and the status element occupying a clearance between the circuit protector and the lid.

Optionally, the clearance between the circuit protector and the lid is generally less than one inch. The status element may comprise a housing and an antenna projecting from the housing. The antenna comprises a helical antenna. The circuit protector may have a longitudinal axis, with the antenna extending generally parallel to the longitudinal axis. The status element may comprise multiple batteries connected in parallel, with the batteries generally positioned in a plane extending parallel to the longitudinal axis. The status element may further comprise a battery tab preventing electrical connection of the batteries. The module may comprise a housing and a hinged cover mounted to the housing. The housing may comprise a fin increasing a surface area of the housing. The status element may comprise a touch safe cover portion extending from the housing, and the cover portion may comprise at least one ventilation opening. The status element may comprise a monitoring module mechanically and electrically connected to terminal elements of the circuit protector at a location exterior to the circuit protector, with the module adapted for retrofit installation to the circuit protector.

Also optionally, the circuit protector may comprise a fuse, with the status element transmitting data related to operation of the fuse, and the data comprising a plurality of data bits selected from the group comprising a unique radio identifier, a manufacturer serial number for the status element, a device type code for the circuit protector, a location or address code for the circuit protector, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code. The status element may comprise a circuit board interfacing a high voltage portion and a low voltage portion, and silicon caulking insulating and isolating the high voltage portion from the low voltage portion.

Another embodiment of a circuit protector monitoring assembly is also disclosed herein. The assembly comprises: at least one circuit protector defining an interruptible current path therethrough upon an occurrence of specified current conditions through the interruptible current path; a status element connectable in parallel with the circuit protector and adapted to sense an operating state of the current path and wirelessly transmit information regarding the operating state of the current path, the information including a circuit protector identifier and a circuit protector location; and the status element comprising a housing defining a DIN rail slot, and a sensor board extending generally parallel to the DIN rail slot.

Optionally, the sensor board may comprise a high voltage portion and a low voltage portion, and silicon caulking insulating and isolating the high voltage portion from the low voltage portion. The status element may further comprise a radio board, with the radio board extending generally parallel to the sensor board. The status element may comprise an antenna projecting outwardly from the housing, and the antenna may extend generally parallel to the DIN rail slot. The status element may comprise multiple batteries arranged in a plane extending generally parallel to the DIN rail slot. A hinged cover may be mounted to the housing of the status element.

While the invention has been described in terms of various specific embodiments, those skilled in the art will recognize that the invention can be practiced with modification within the spirit and scope of the claims.

What is claimed is:

1. A circuit protector monitoring assembly comprising:
   at least one circuit protector defining an interruptible current path therethrough upon an occurrence of specified current conditions through the interruptible current path;
   a status element connected in parallel with the circuit protector and adapted to sense an operating state of the current path and wirelessly transmit information regarding the operating state of the current path, the information including a circuit protector identifier and a circuit protector location; and
   the status element comprising a housing and an antenna projecting from the housing.

2. The assembly of claim 1, wherein the status element occupies a clearance above the circuit protector that is generally less than one inch.

3. The assembly of claim 1, wherein the antenna comprises a helical antenna.

4. The assembly of claim 1, wherein the circuit protector has a longitudinal axis, the antenna extending generally parallel to the longitudinal axis.

5. The assembly of claim 1, wherein the circuit protector is located in an enclosure having a lid, the status element fitting between the circuit protector and the lid.

6. The assembly of claim 1, wherein the circuit protector has a longitudinal axis and the status element comprises multiple batteries connected in parallel, the batteries generally positioned in a plane extending parallel to the longitudinal axis.

7. The assembly of claim 1, wherein the status element further comprises a battery tab preventing electrical connection of the batteries.

8. The assembly of claim 1, wherein the status element comprises a housing and a hinged cover mounted to the housing.

9. The assembly of claim 1, wherein the housing comprises a fin increasing a surface area of the housing.

10. The assembly of claim 1, wherein the status element comprises a touch safe cover portion extending from the housing.

11. The assembly of claim 10, wherein the cover portion comprises at least one ventilation opening.

12. The assembly of claim 1, wherein the housing comprises a DIN rail slot.

13. The assembly of claim 1, wherein the status element comprises a monitoring module mechanically and electrically connected to terminal elements of the circuit protector at a location exterior to the circuit protector, the module adapted for retrofit installation to the circuit protector.

14. The assembly of claim 1, wherein the at least one circuit protector comprises a fuse, the status element transmitting data related to operation of the fuse, the data comprising a plurality of data bits selected from the group comprising a unique radio identifier, a manufacturer serial number for the status element, a device type code for the circuit protector, a location or address code for the circuit protector, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code.

15. A circuit protector monitoring assembly comprising:
an enclosure and a lid collectively defining a closeable container for at least one circuit protector;
at least one circuit protector situated within the enclosure and defining an interruptible current path therethrough upon an occurrence of specified current conditions through the interruptible current path;
a status element connected in parallel with the circuit protector and adapted to sense an operating state of the current path and wirelessly transmit information regarding the operating state of the current path, the information including a circuit protector identifier and a circuit protector location; and
the status element occupying a clearance between the circuit protector and the lid.

16. The assembly of claim 15, wherein the clearance between the circuit protector and the lid is generally less than one inch.

17. The assembly of claim 15, wherein the status element comprises a housing and an antenna projecting from the housing.

18. The assembly of claim 15, wherein the antenna comprises a helical antenna.

19. The assembly of claim 15, wherein the circuit protector has a longitudinal axis, the antenna extending generally parallel to the longitudinal axis.

20. The assembly of claim 15, wherein the circuit protector has a longitudinal axis and the status element comprises multiple batteries connected in parallel, the batteries generally positioned in a plane extending parallel to the longitudinal axis.

21. The assembly of claim 20, wherein the status element further comprises a battery tab preventing electrical connection of the batteries.

22. The assembly of claim 15, wherein the module comprises a housing and a hinged cover mounted to the housing.

23. The assembly of claim 15, wherein the housing comprises a fin increasing a surface area of the housing.

24. The assembly of claim 15, wherein the status element comprises a touch safe cover portion extending from the housing.

25. The assembly of claim 15, wherein the cover portion comprises at least one ventilation opening.

26. The assembly of claim 15, wherein the status element comprises a monitoring module mechanically and electrically connected to terminal elements of the circuit protector at a location exterior to the circuit protector, the module adapted for retrofit installation to the circuit protector.

27. The assembly of claim 15, wherein the at least one circuit protector comprises a fuse, the status element transmitting data related to operation of the fuse, the data comprising a plurality of data bits selected from the group comprising a unique radio identifier, a manufacturer serial number for the status element, a device type code for the circuit protector, a location or address code for the circuit protector, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code.

28. The assembly of claim 15, the status element comprising a circuit board interfacing a high voltage portion and a low voltage portion, and silicon caulking insulating and isolating the high voltage portion from the low voltage portion.

29. The assembly of claim 1, the status element comprising a circuit board interfacing a high voltage portion and a low voltage portion, and silicon caulking insulating and isolating the high voltage portion from the low voltage portion.

30. A circuit protector monitoring assembly comprising:
at least one circuit protector defining an interruptible current path therethrough upon an occurrence of specified current conditions through the interruptible current path;
a status element connectable in parallel with the circuit protector and adapted to sense an operating state of the current path and wirelessly transmit information regarding the operating state of the current path, the information including a circuit protector identifier and a circuit protector location; and
the status element comprising a housing defining a DIN rail slot, and a sensor board extending generally parallel to the DIN rail slot.

31. The assembly of claim 30, the sensor board comprising a high voltage portion and a low voltage portion, and silicon caulking insulating and isolating the high voltage portion from the low voltage portion.

32. The assembly of claim 30, wherein the status element further comprises a radio board, the radio board extending generally parallel to the sensor board.

33. The assembly of claim 32, wherein the antenna extends generally parallel to the DIN rail slot.

34. The assembly of claim 30, wherein the status element comprises multiple batteries arranged in a plane extending generally parallel to the DIN rail slot.

35. The assembly of claim 30, further comprising a hinged cover mounted to the housing of the status element.

36. The assembly of claim 30, wherein the status element further comprises an antenna projecting outwardly from the housing.

* * * * *